May 10, 1927.
W. W. SLOANE
POWER SHOVEL
Original Filed Dec. 18, 1922
1,628,071
30 Sheets-Sheet 1
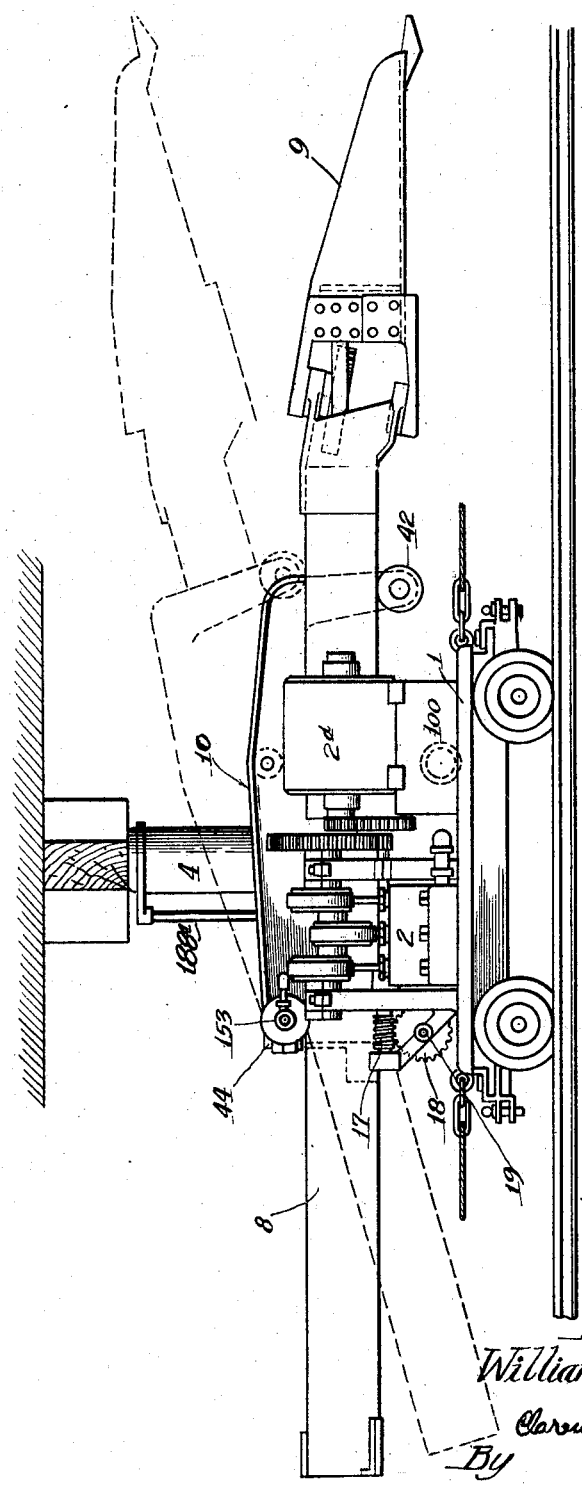

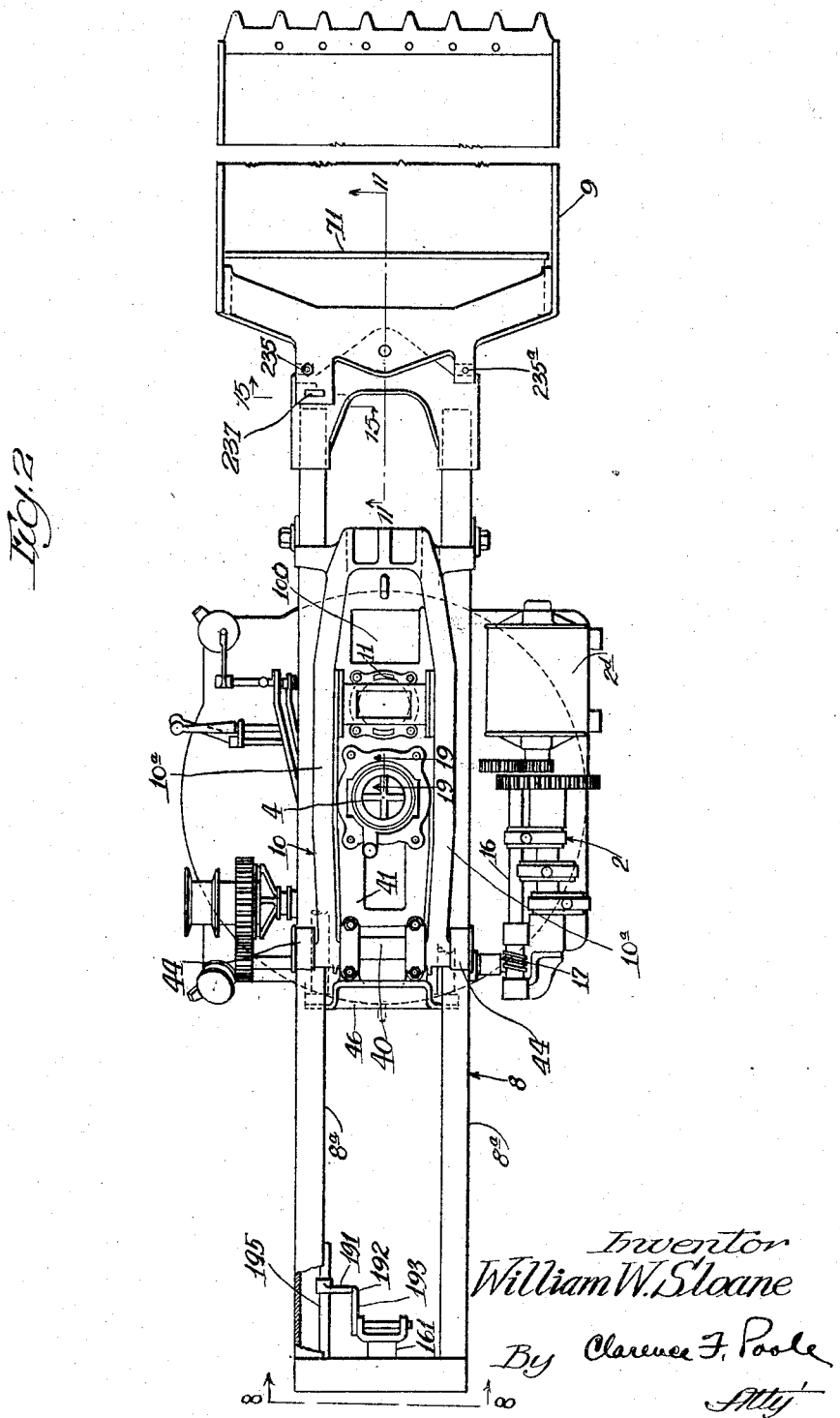

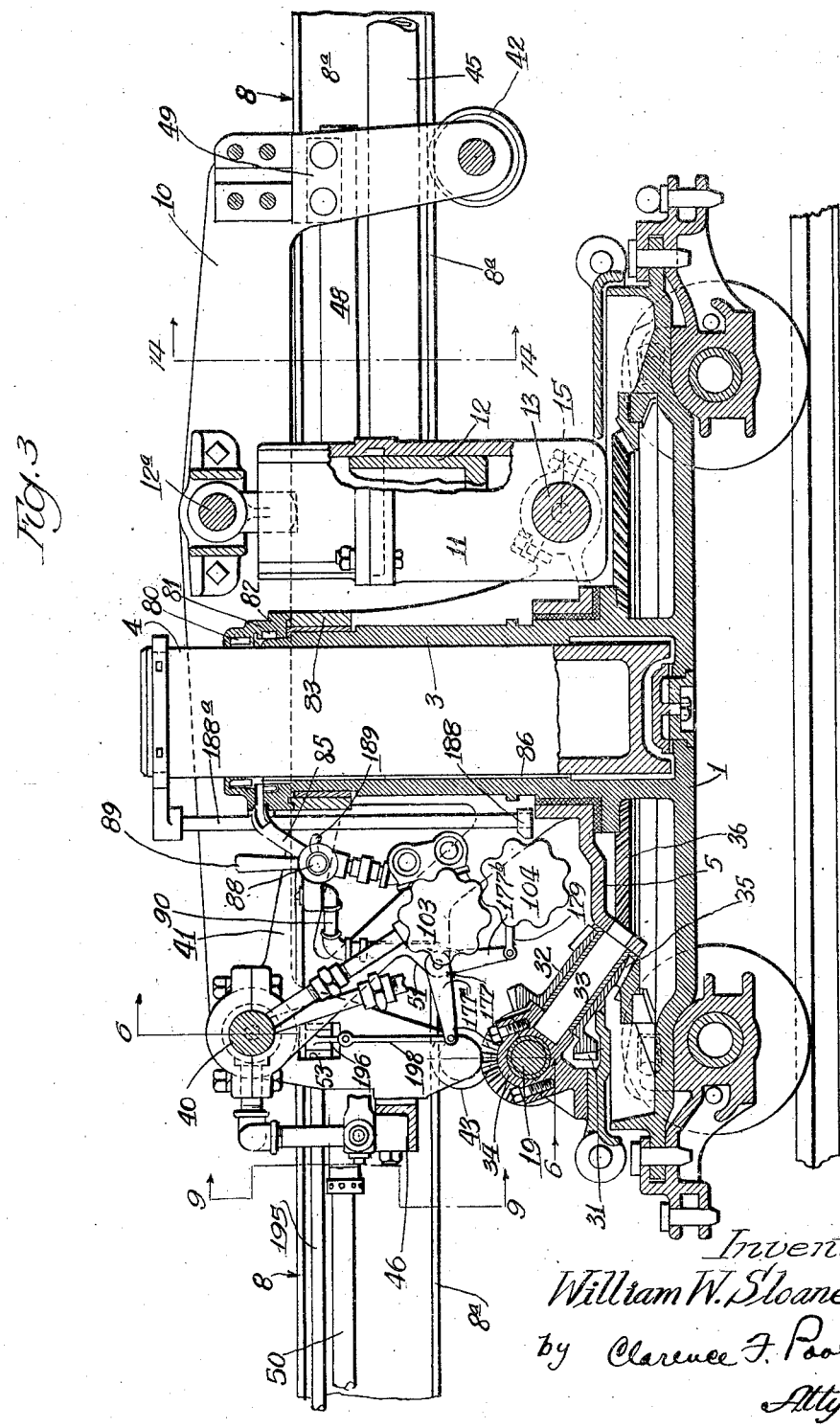

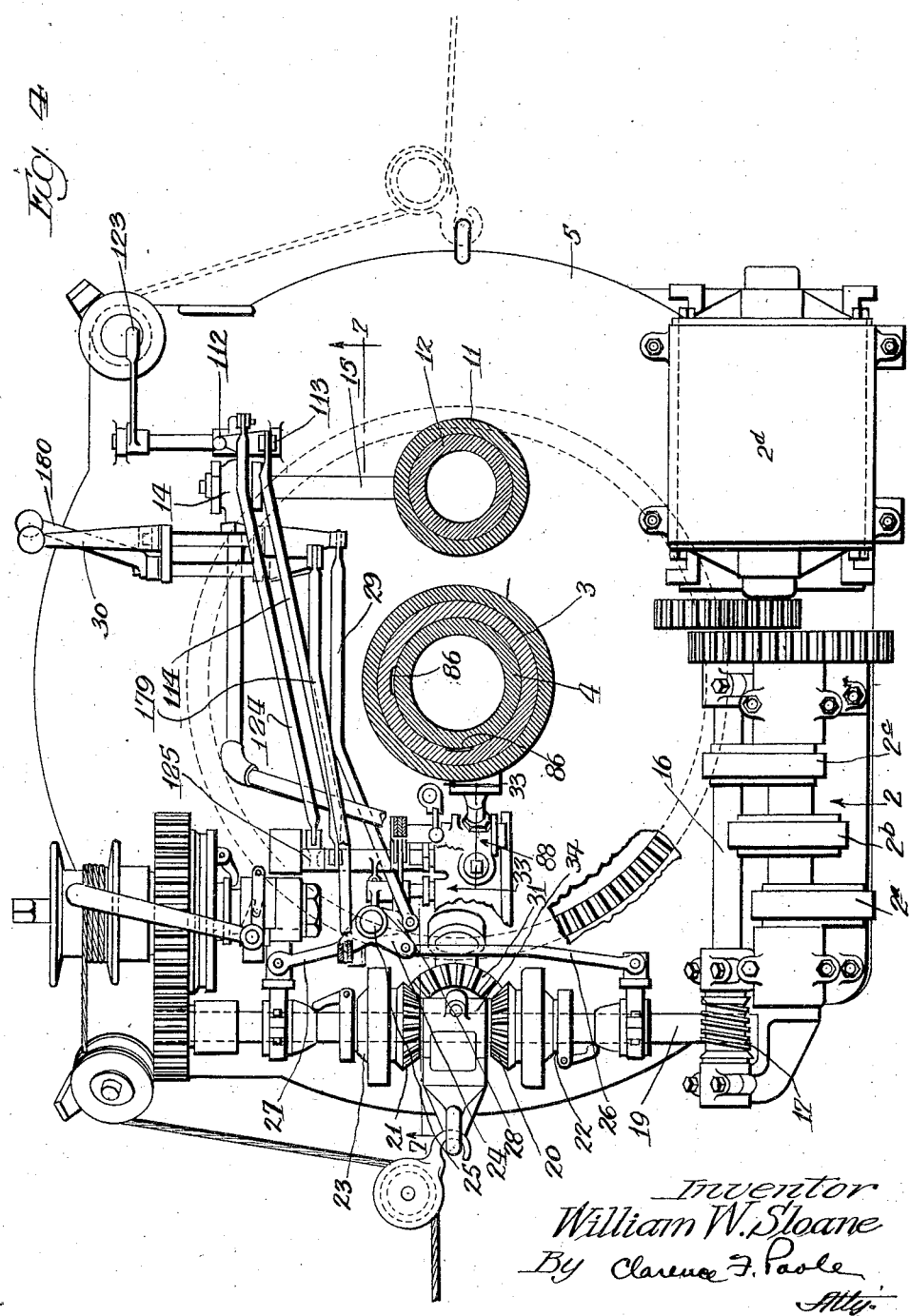

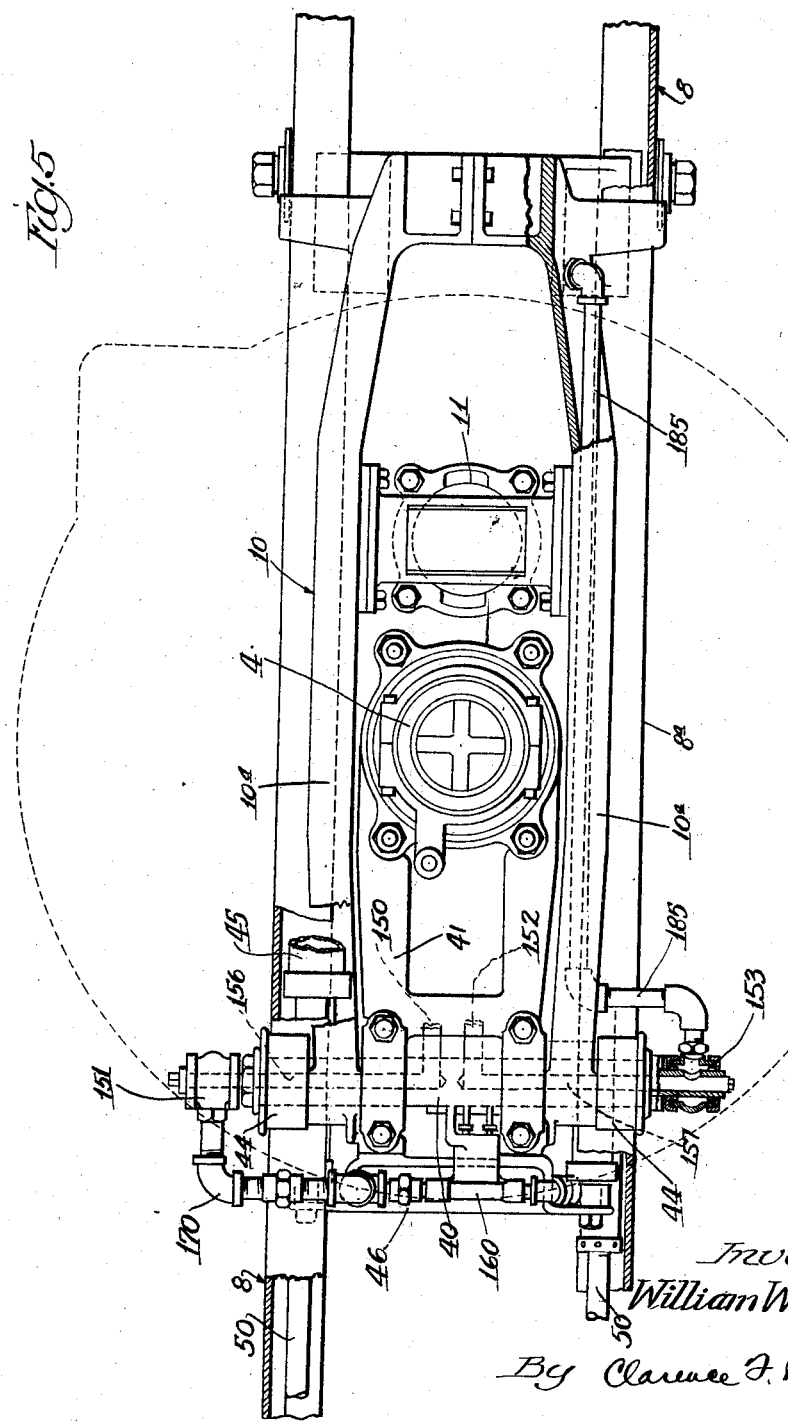

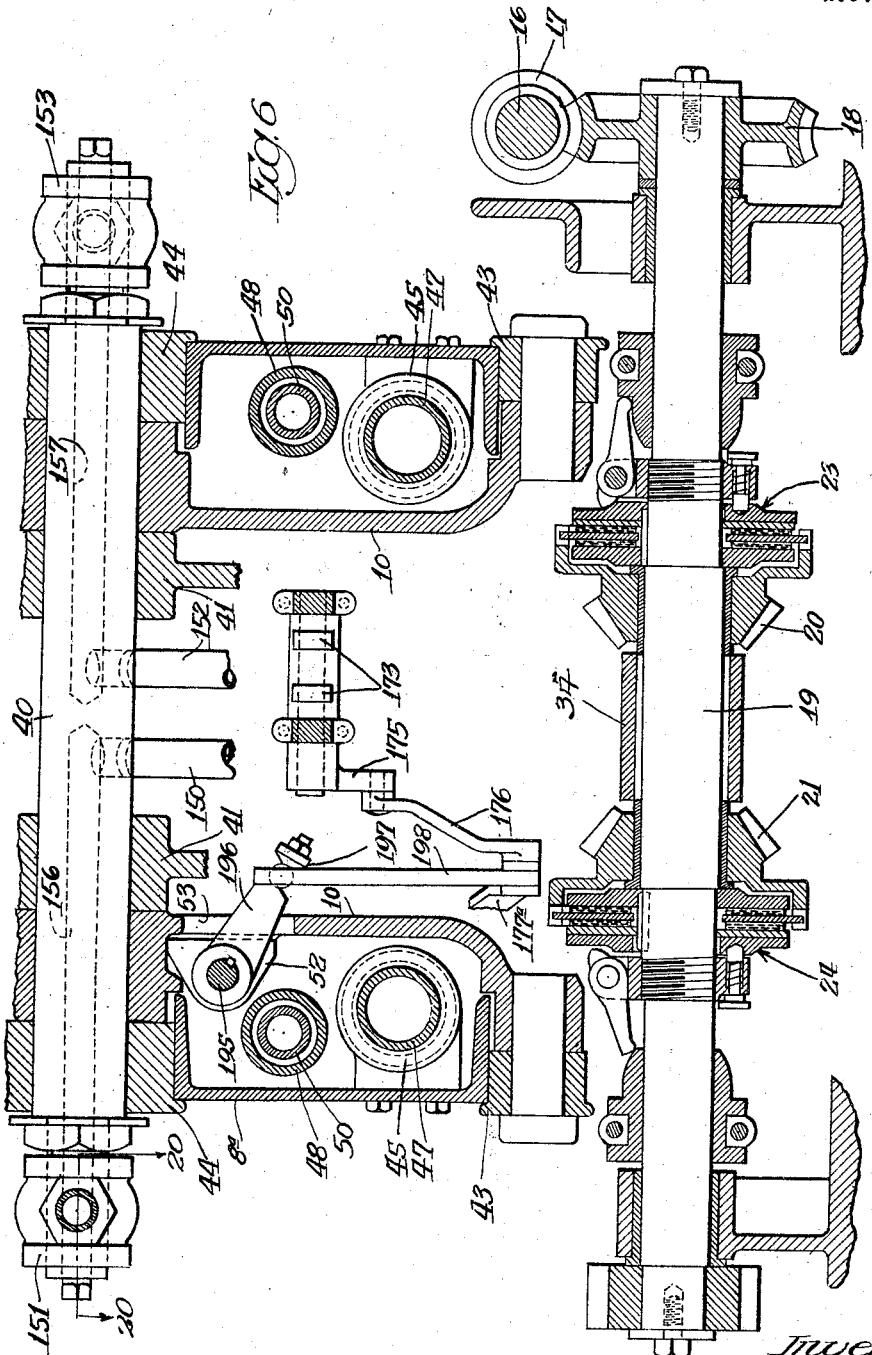

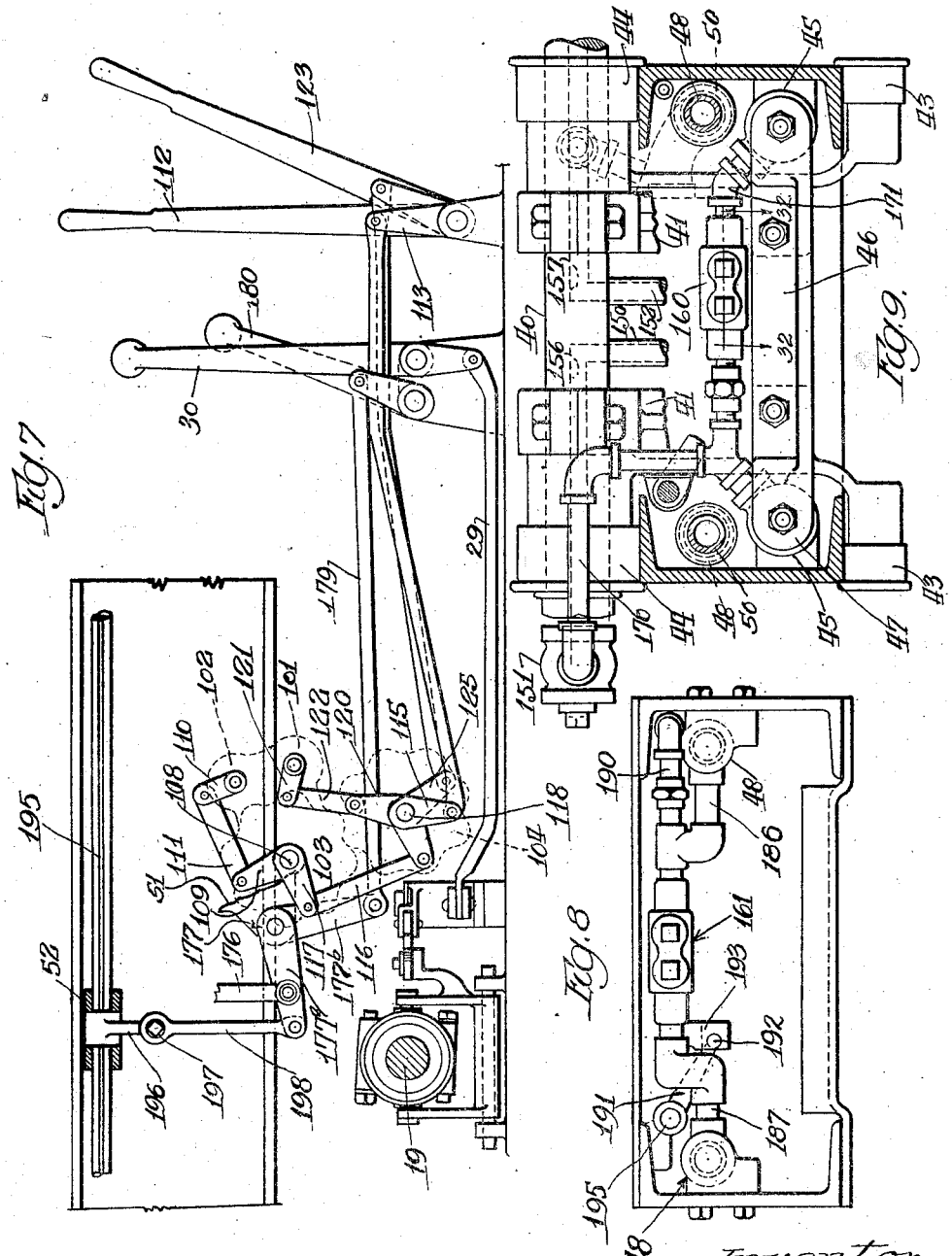

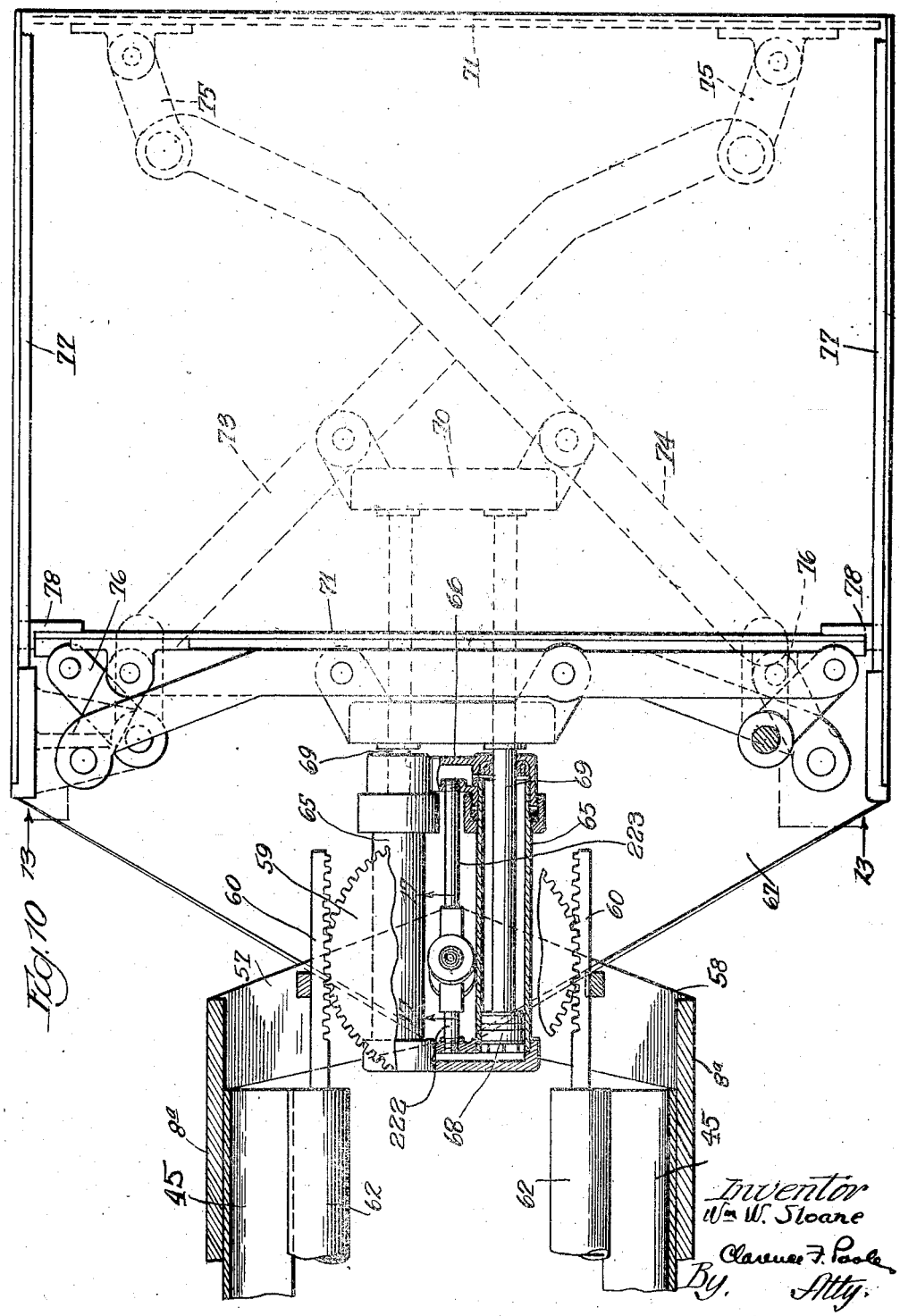

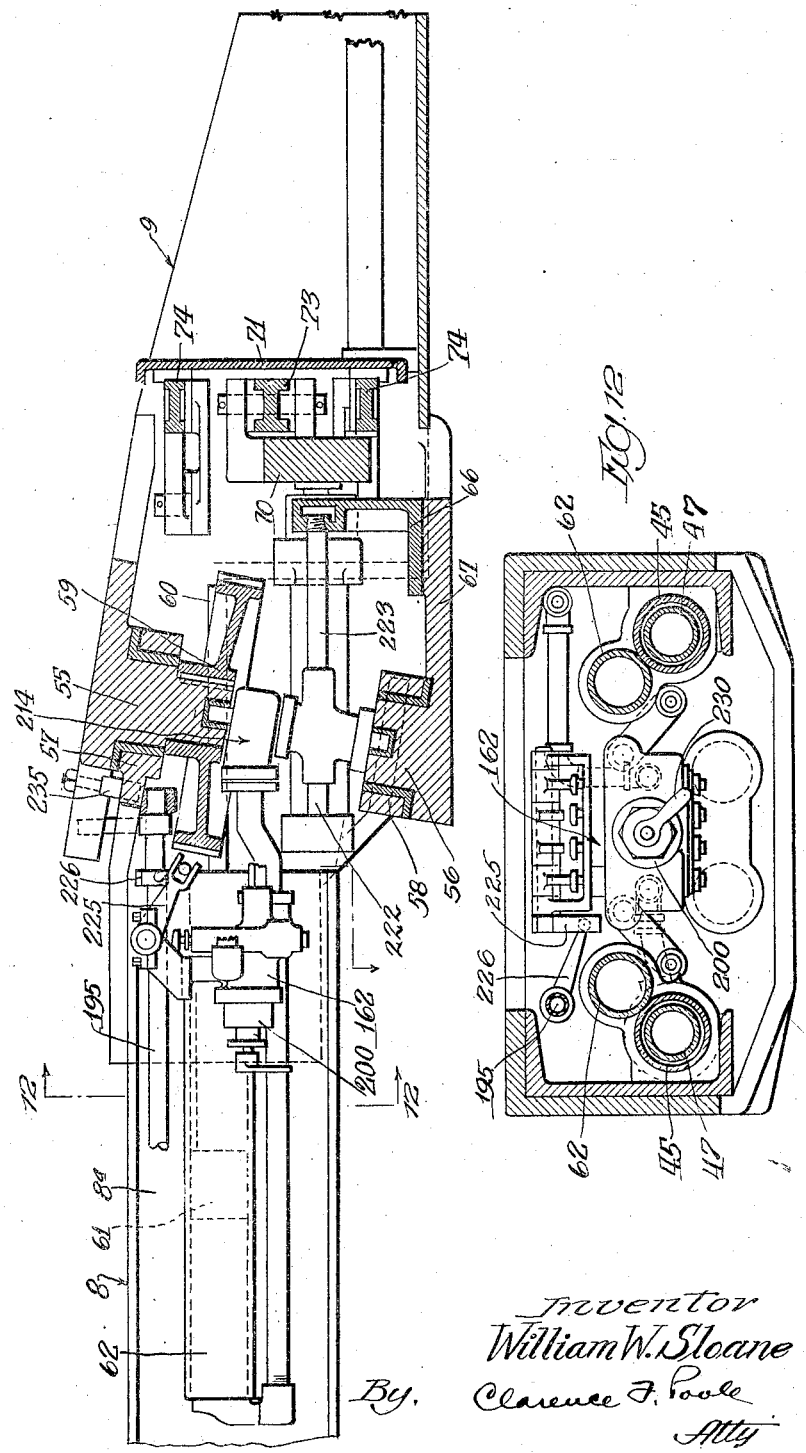

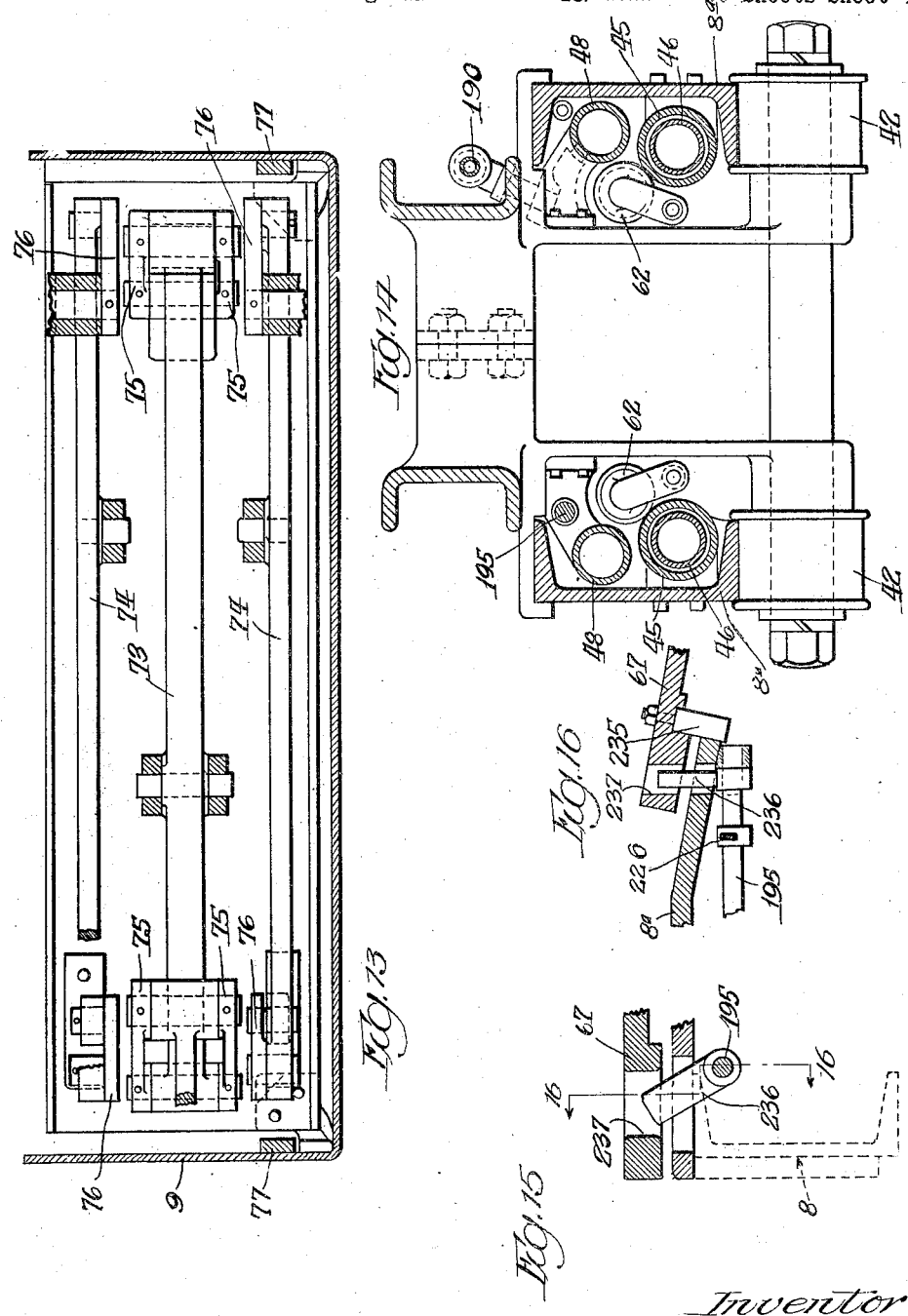

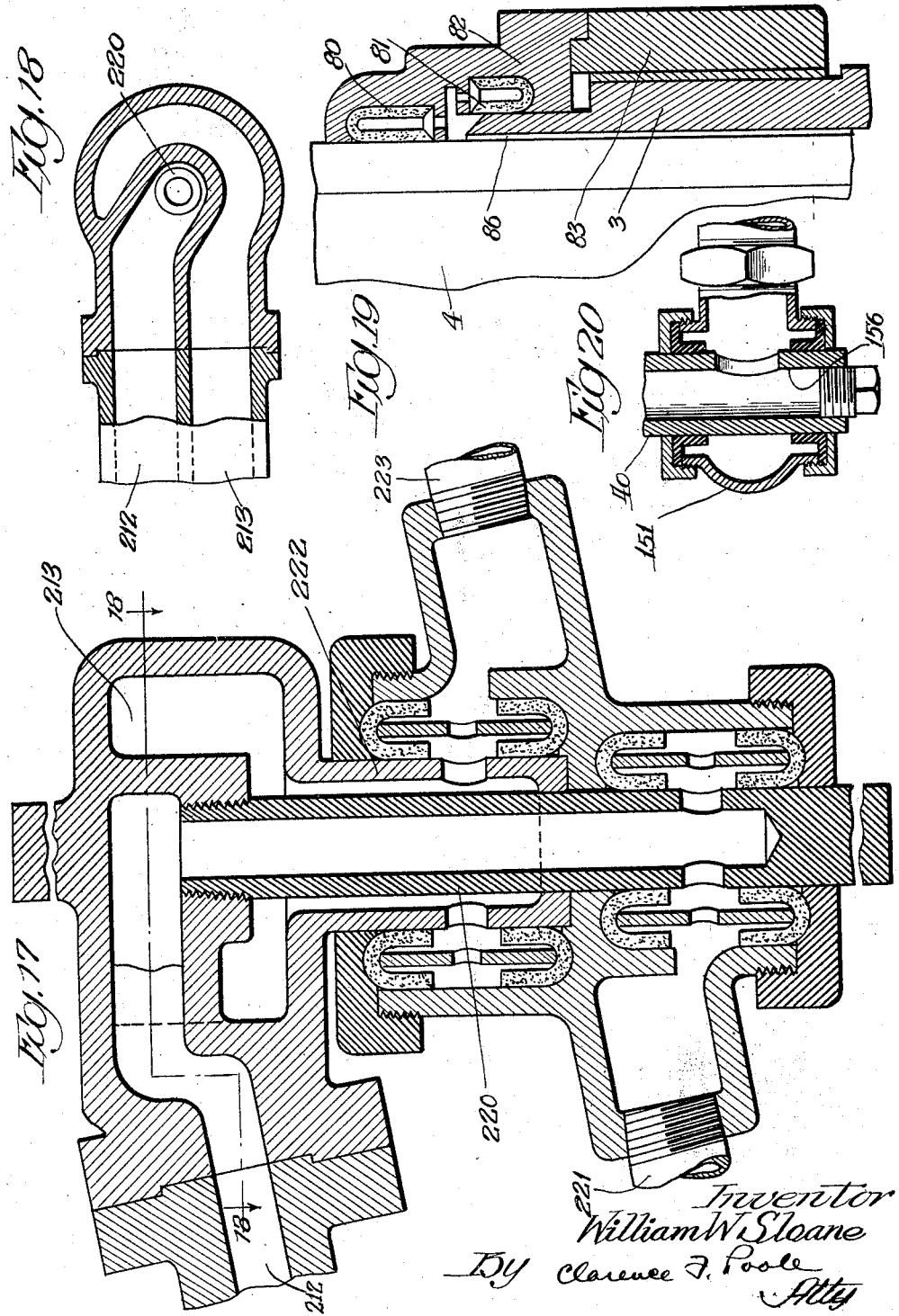

May 10, 1927.
W. W. SLOANE
1,628,071
POWER SHOVEL
Original Filed Dec. 18, 1922   30 Sheets-Sheet 12
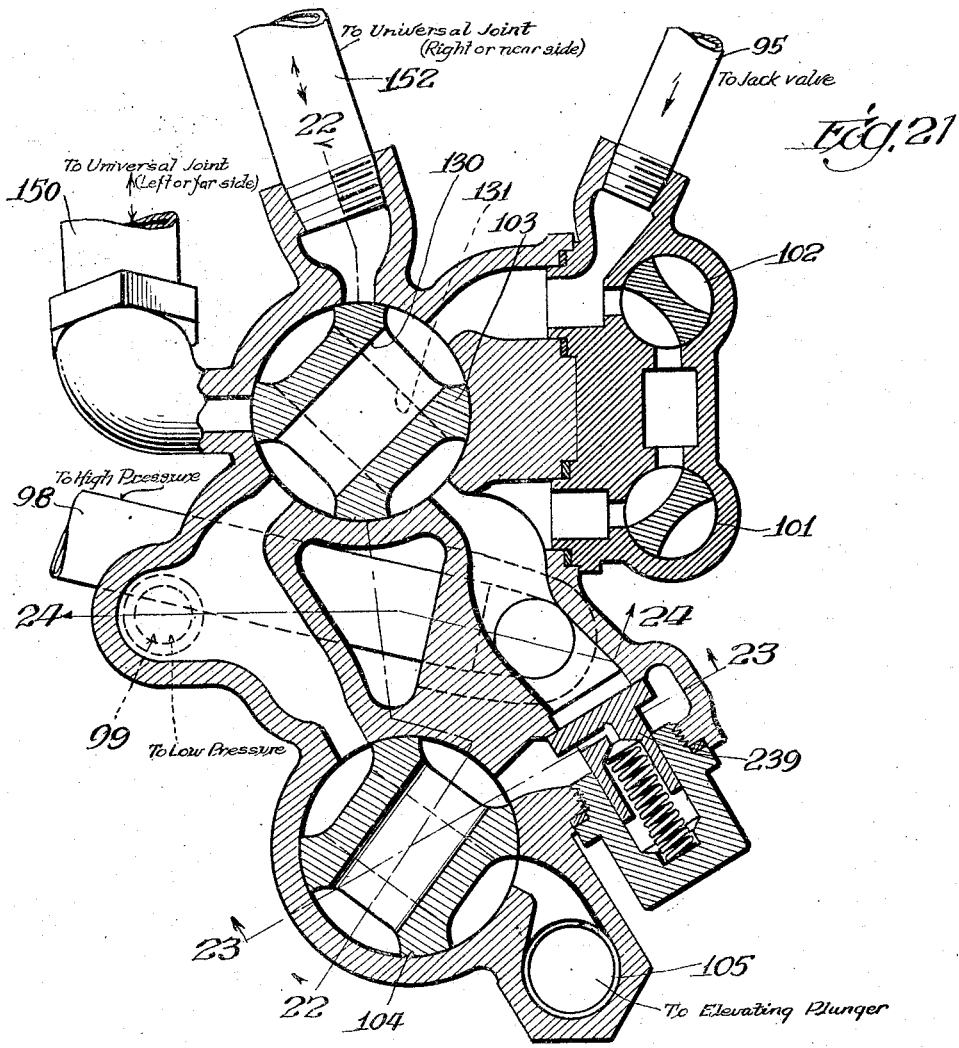

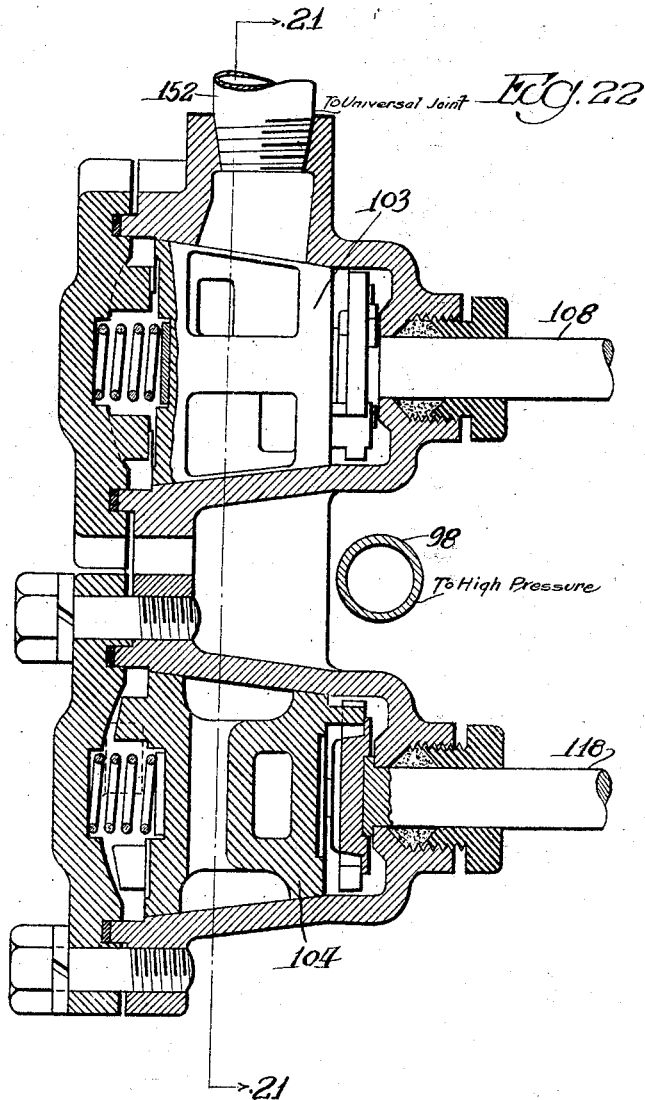

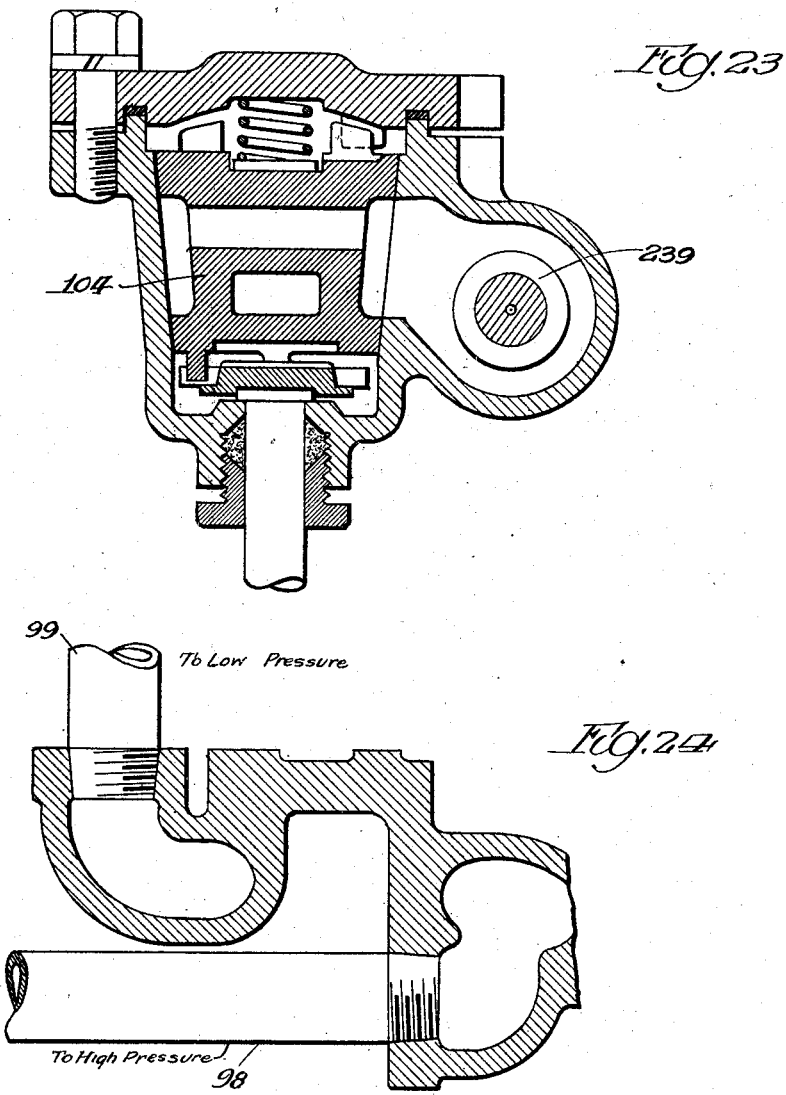

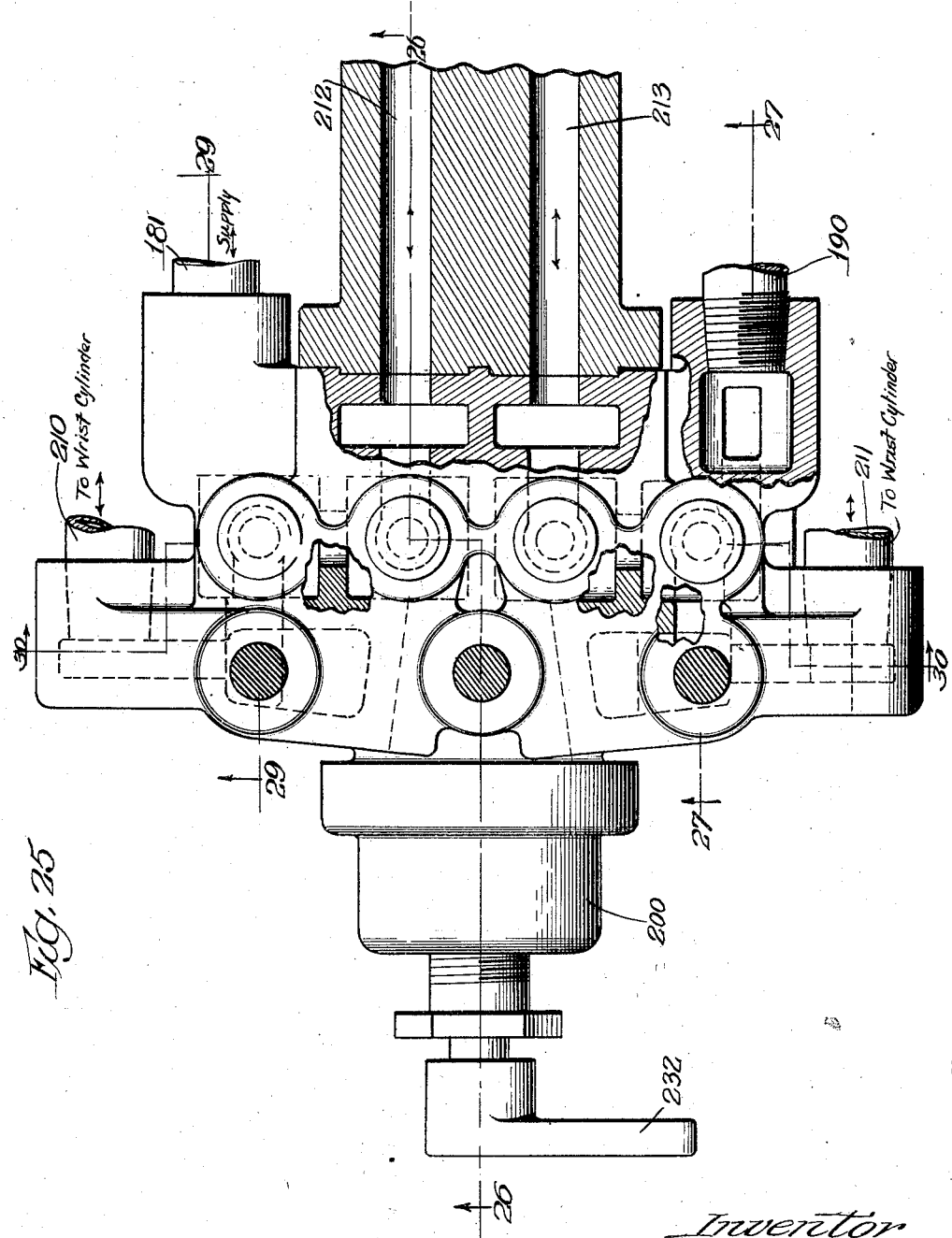

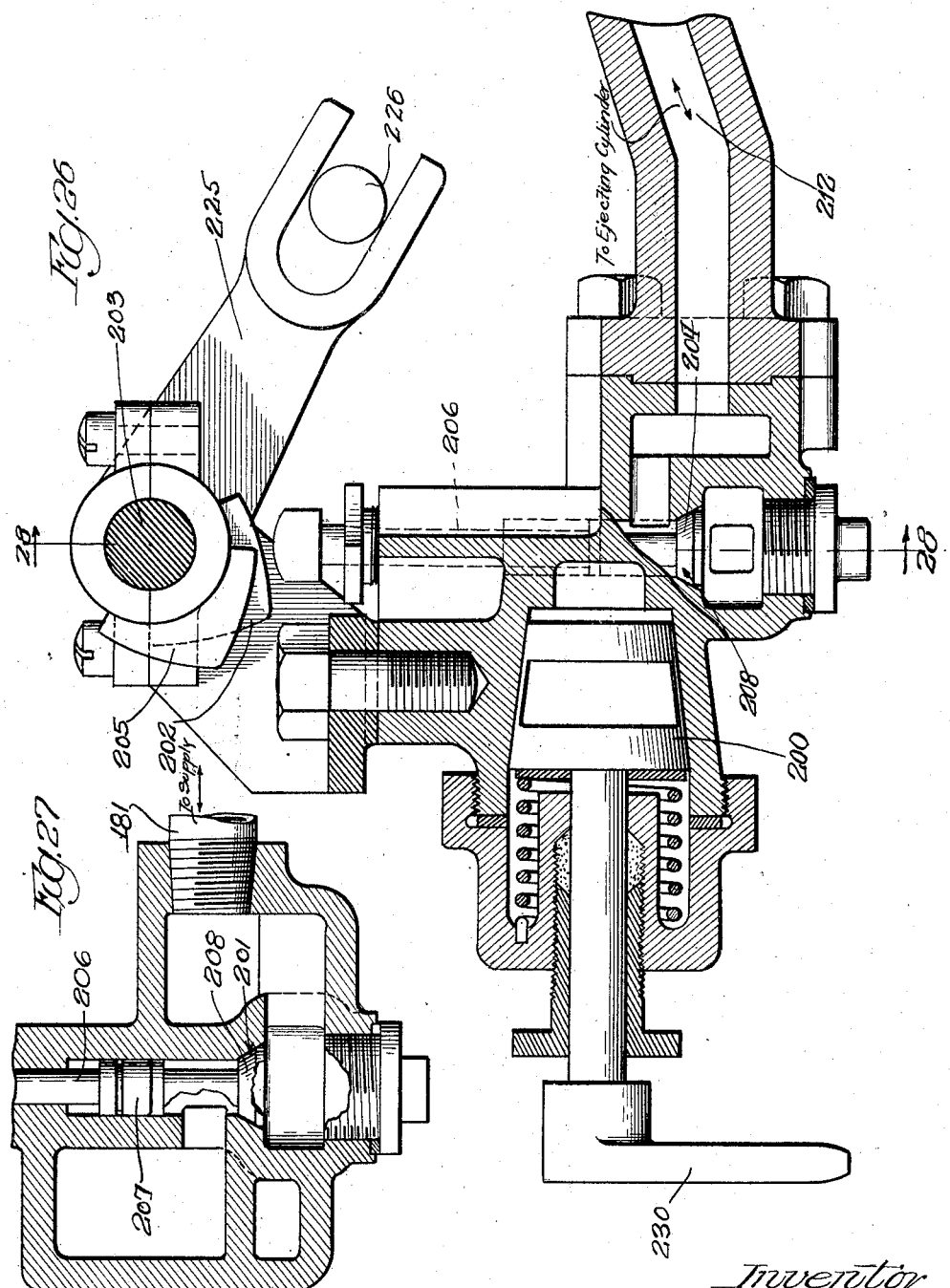

May 10, 1927.
W. W. SLOANE
POWER SHOVEL
Original Filed Dec. 18, 1922   30 Sheets-Sheet 17
1,628,071
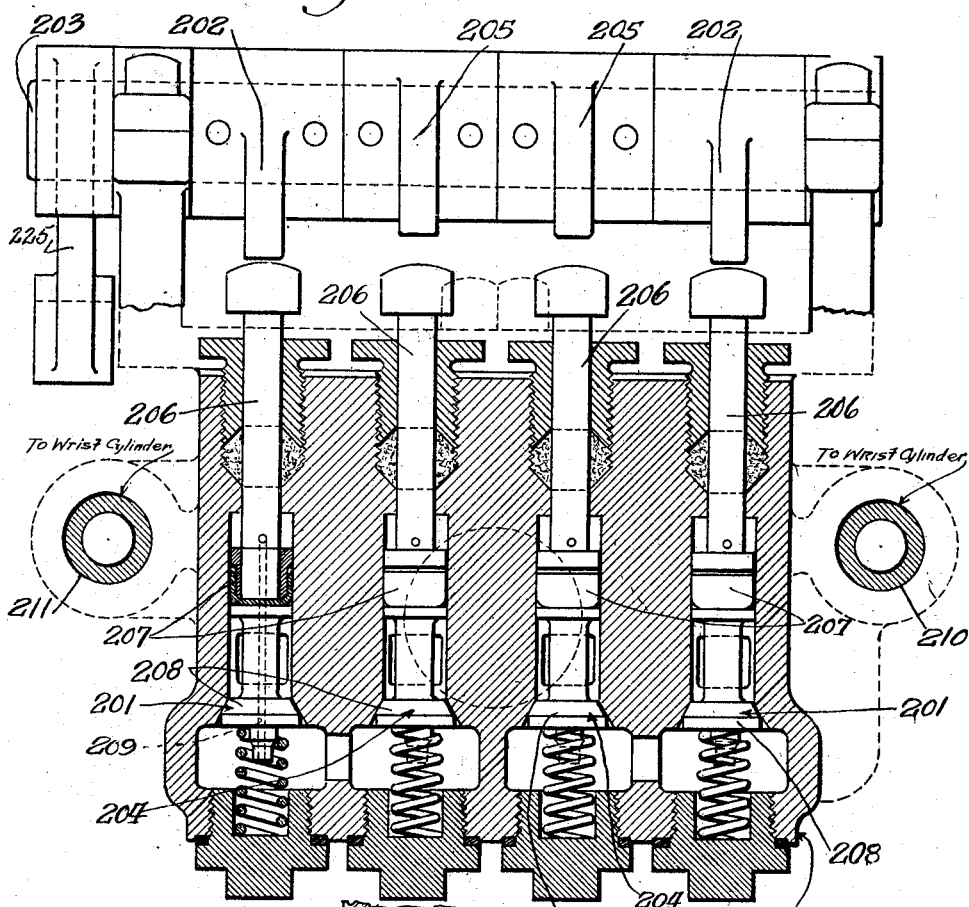
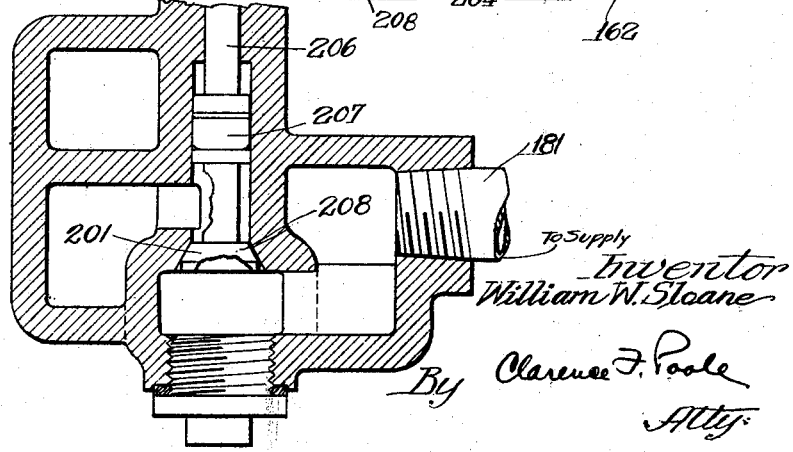

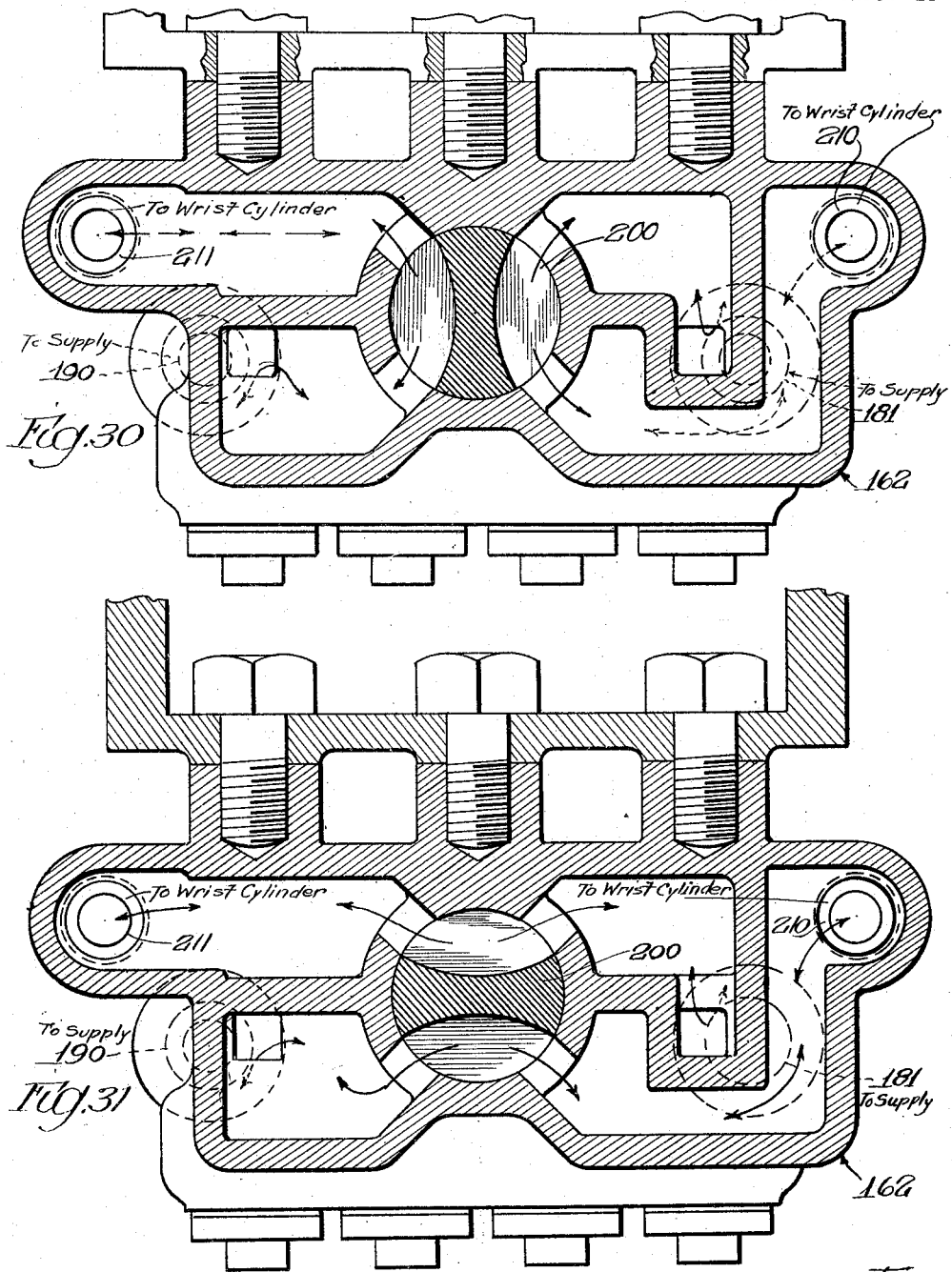

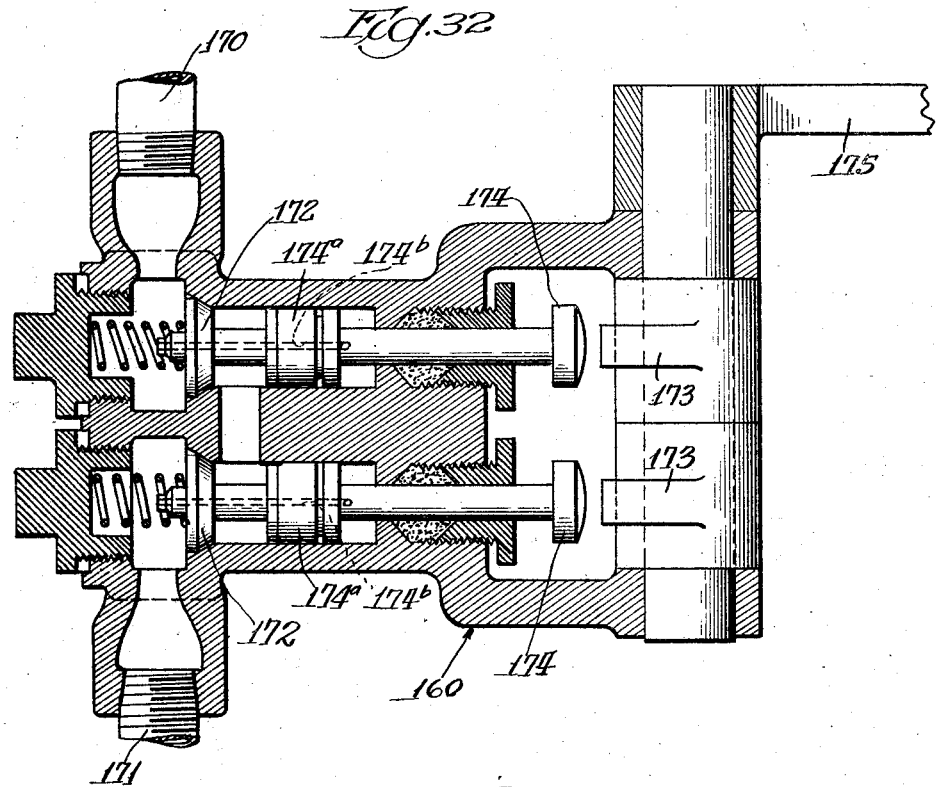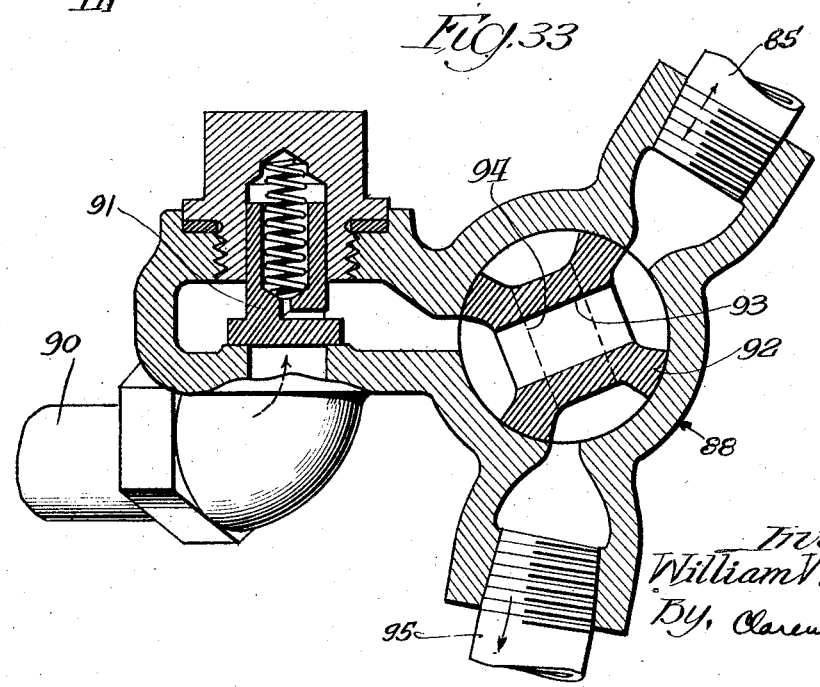

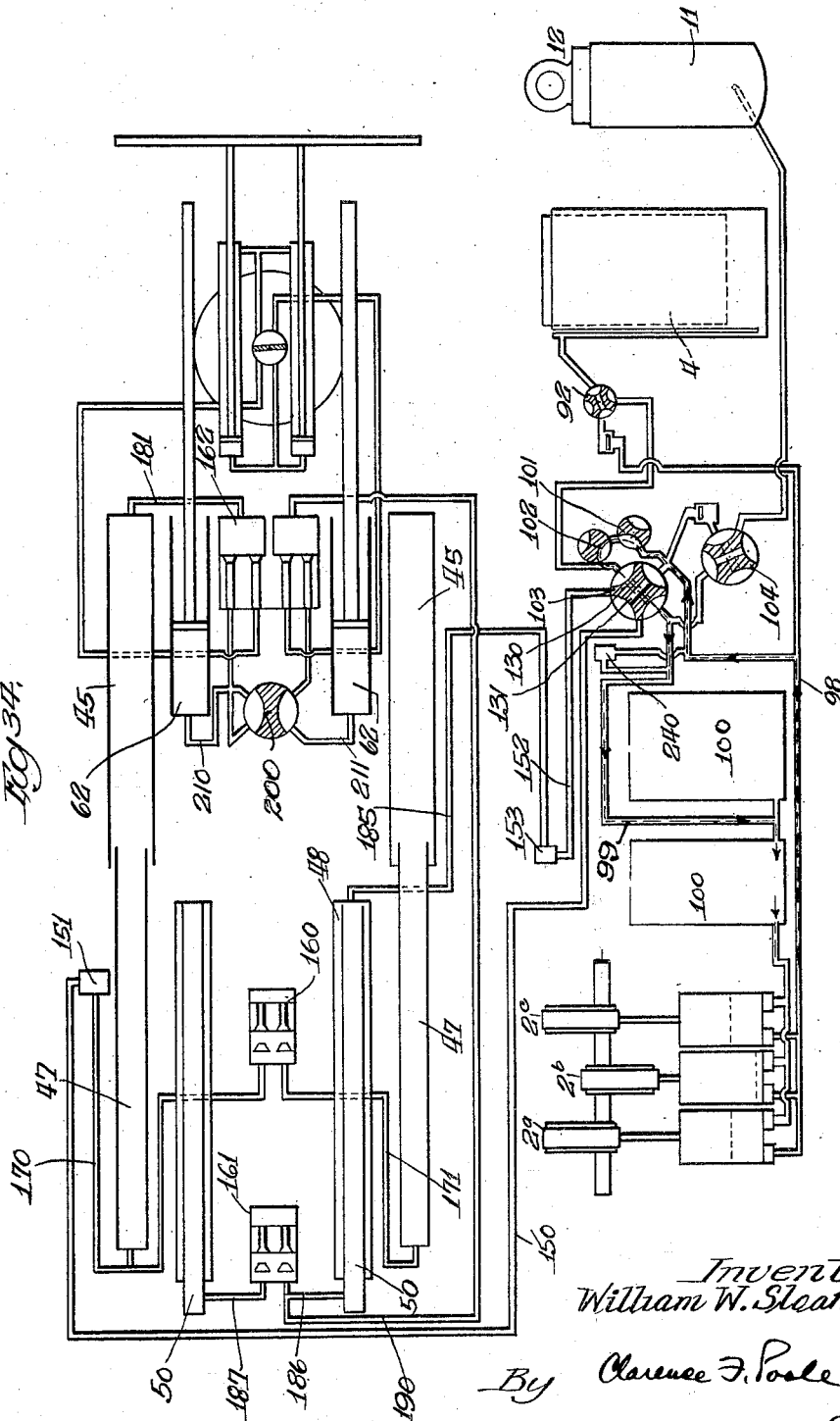

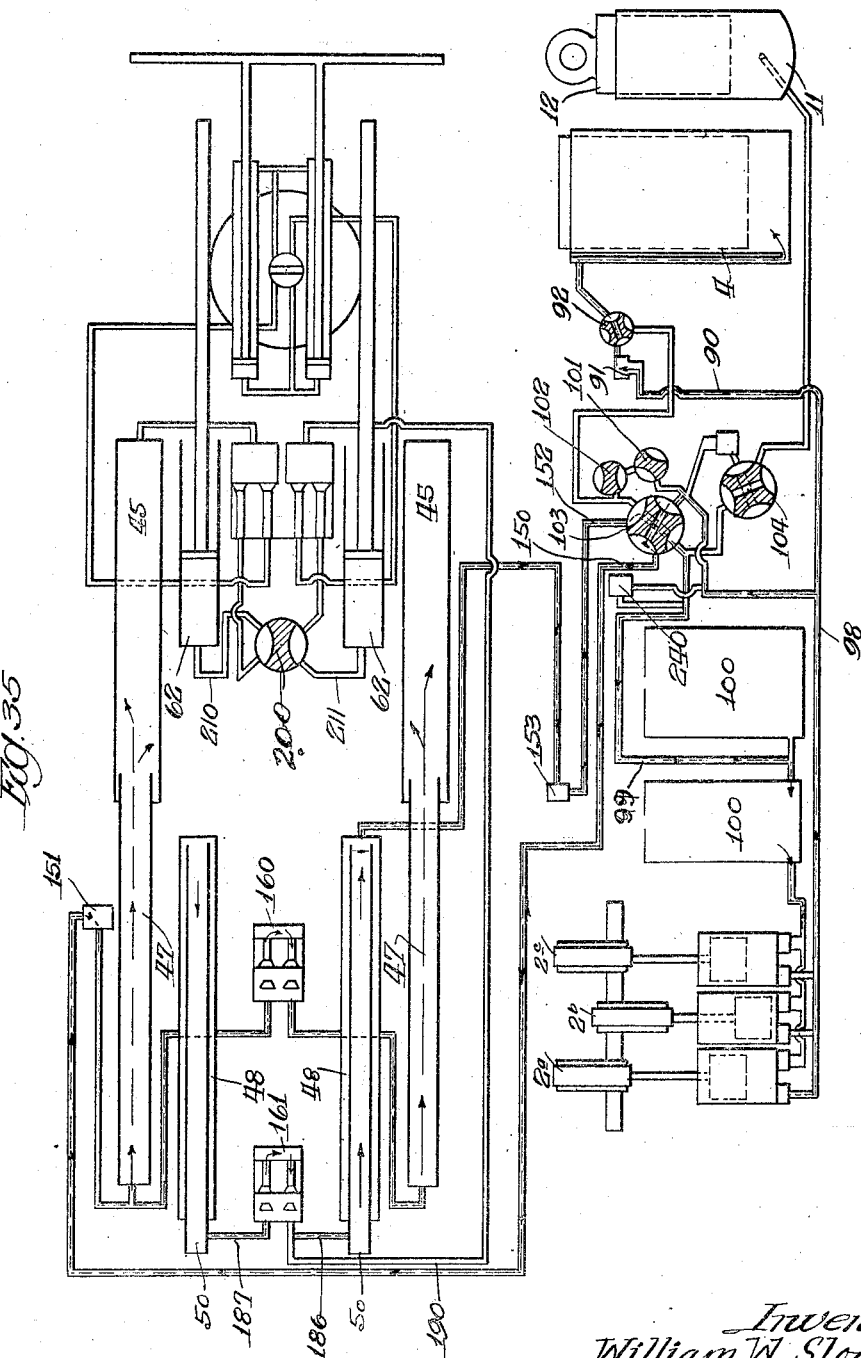

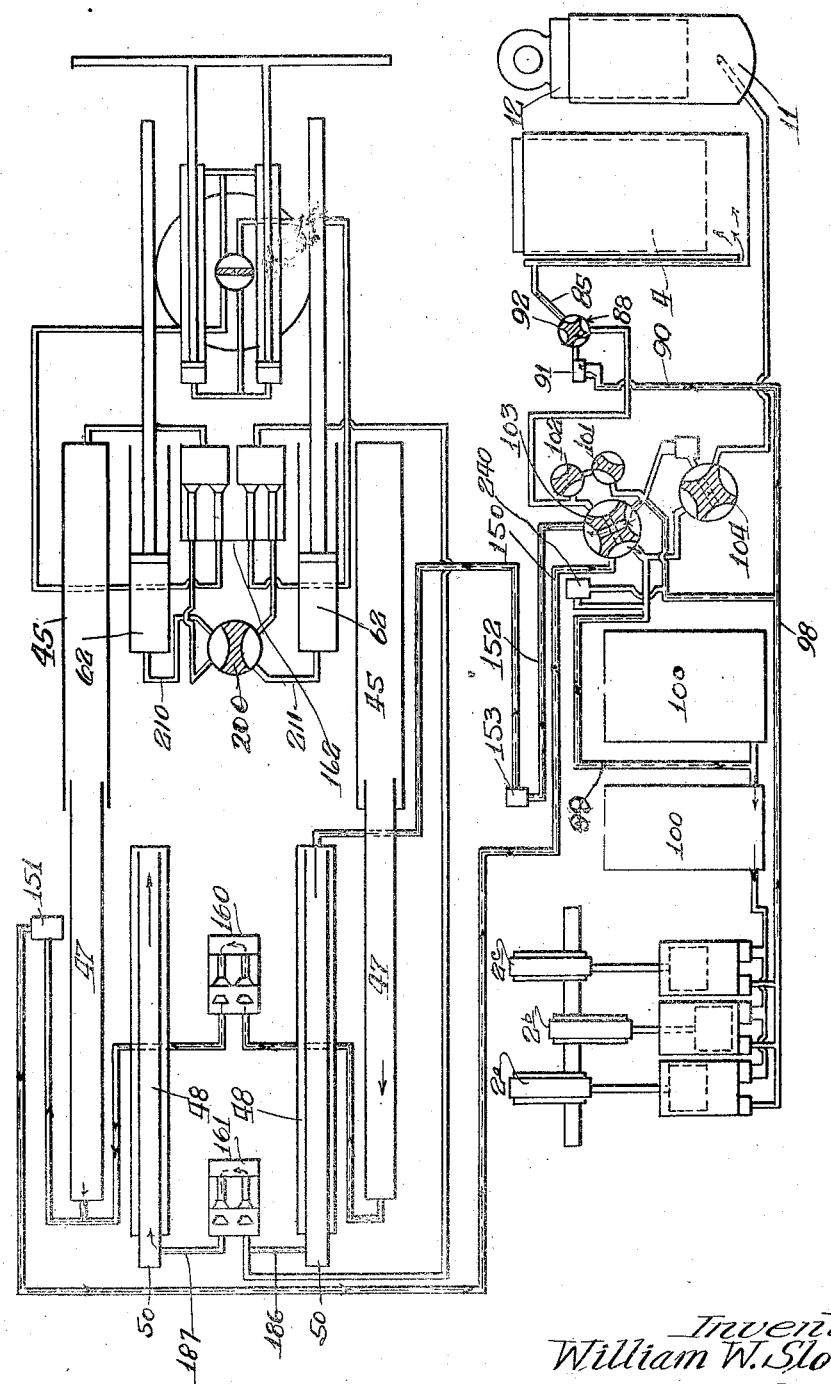

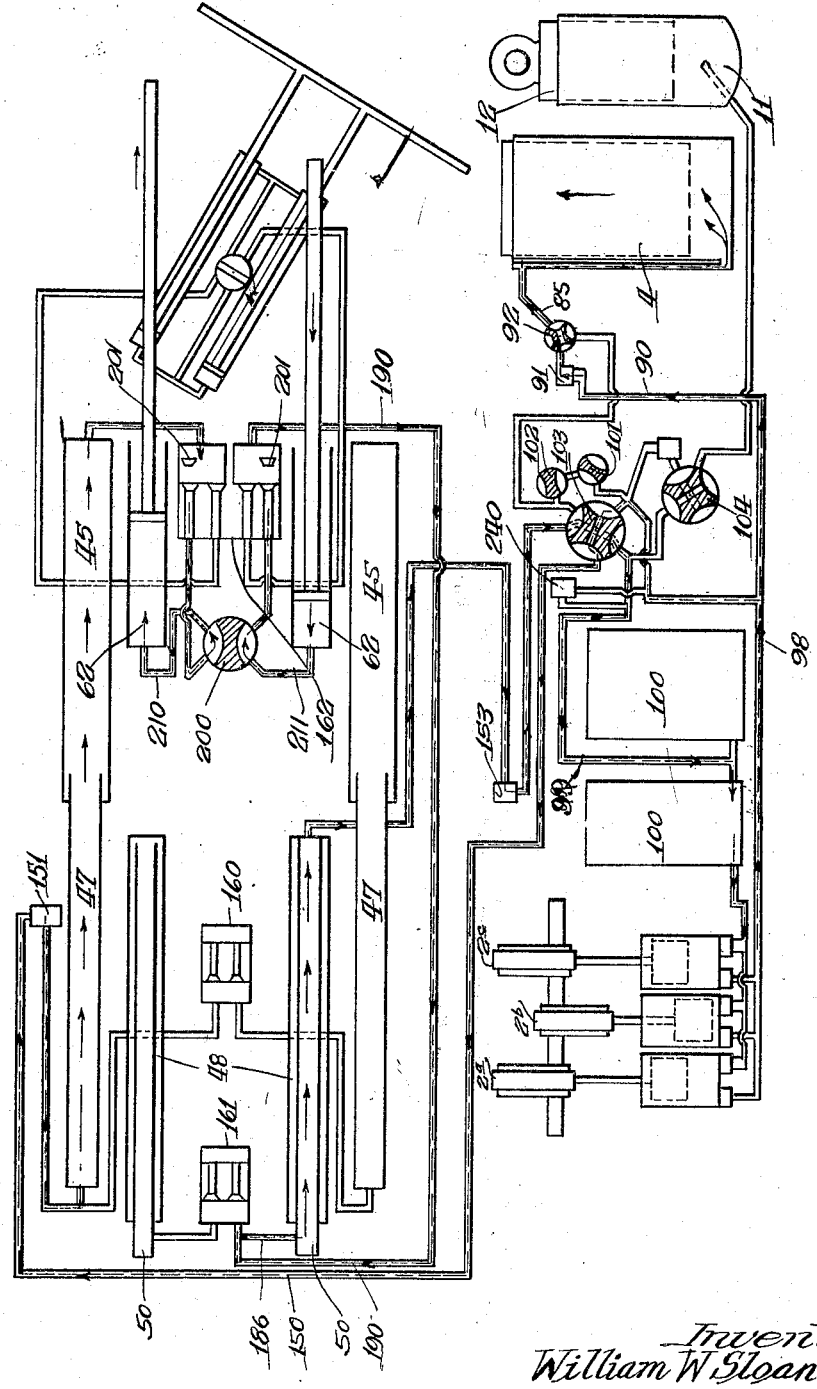

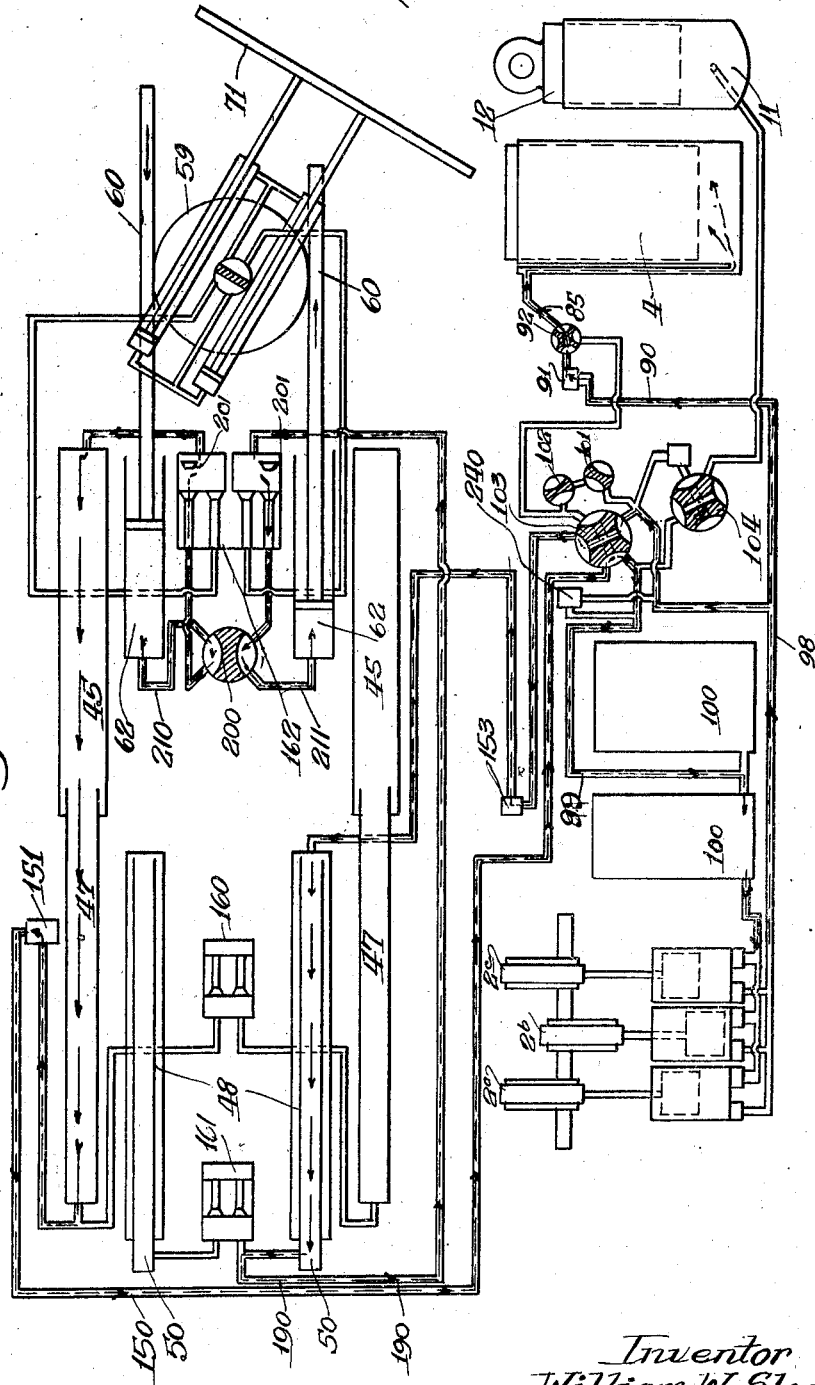

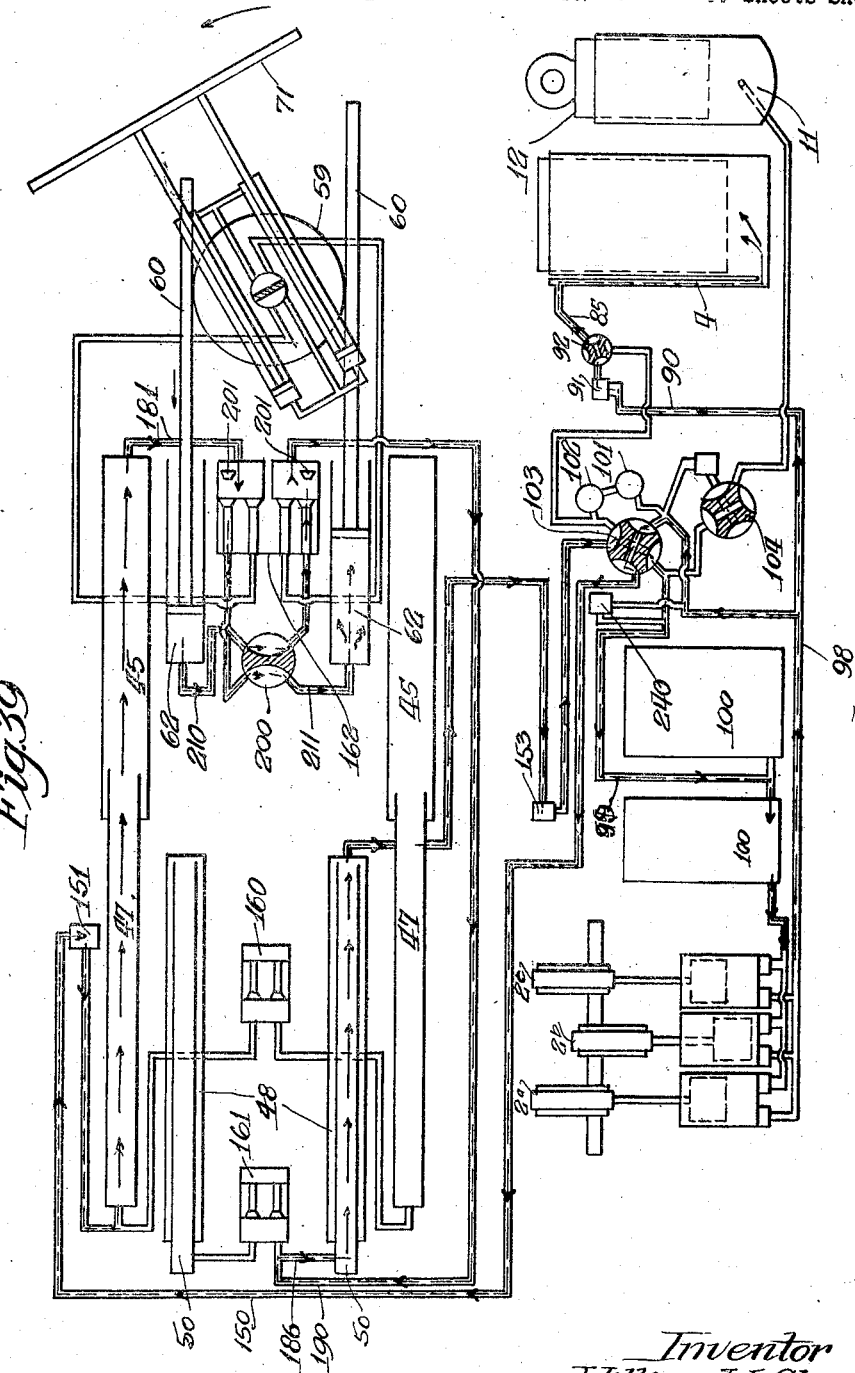

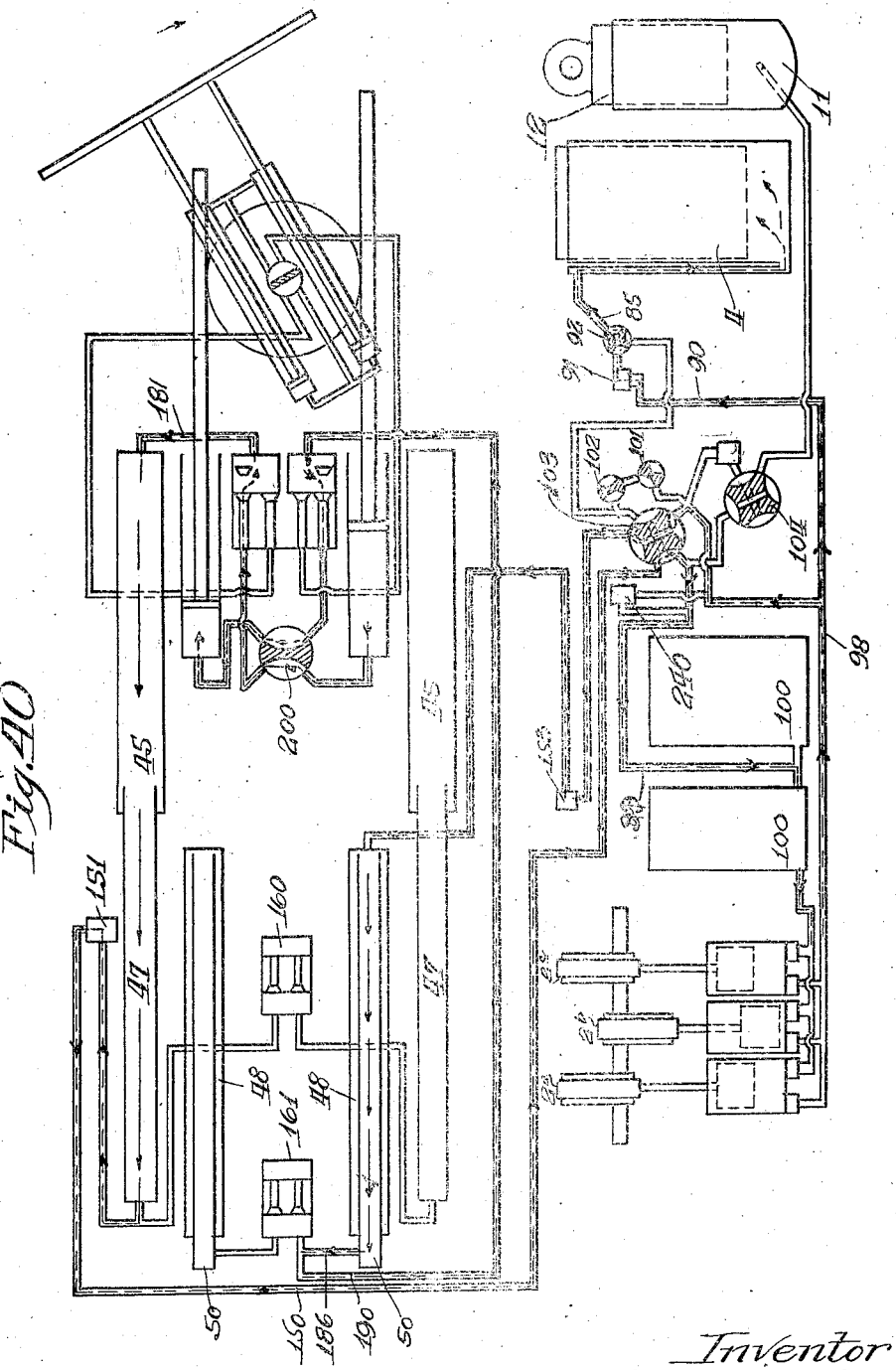

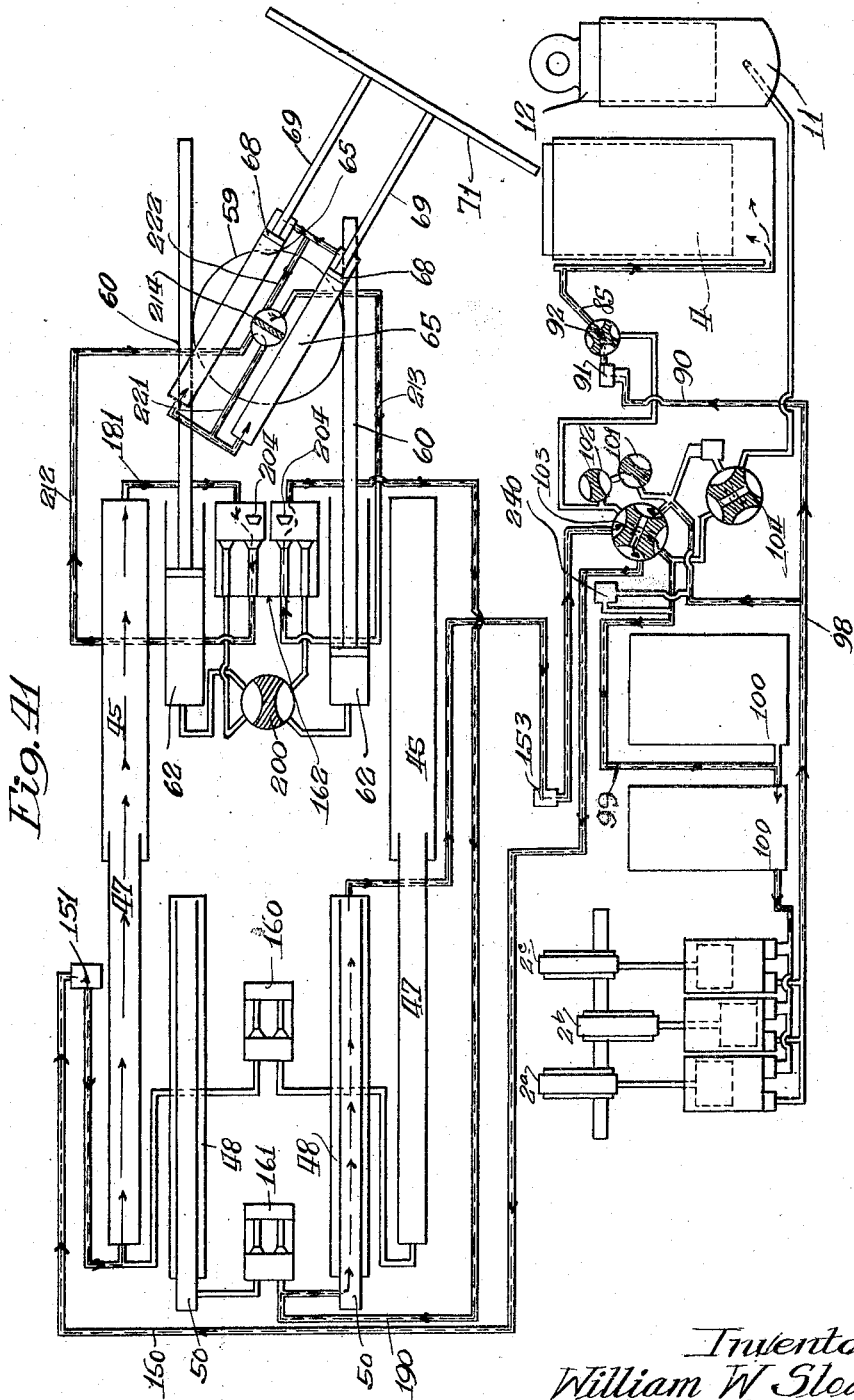

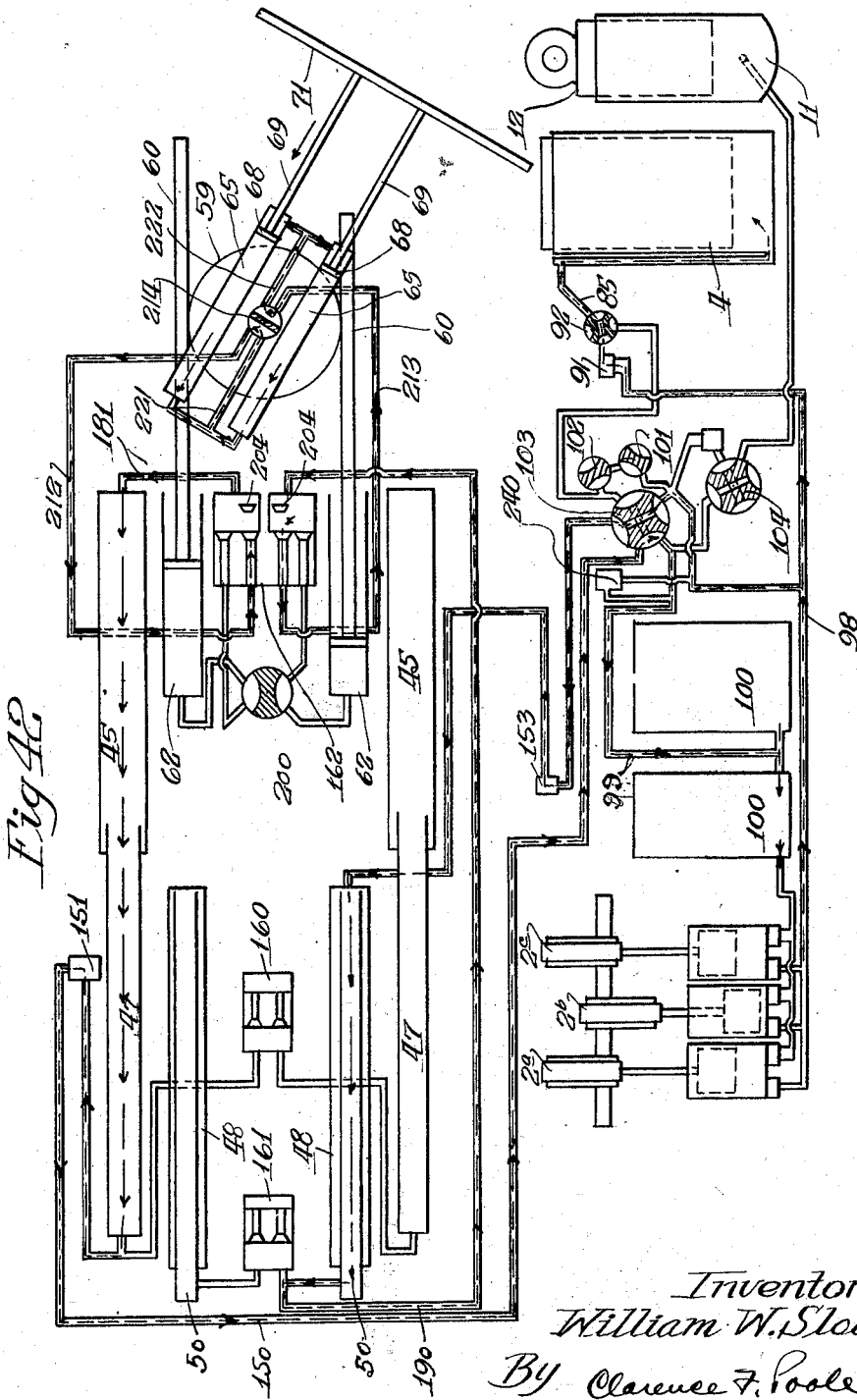

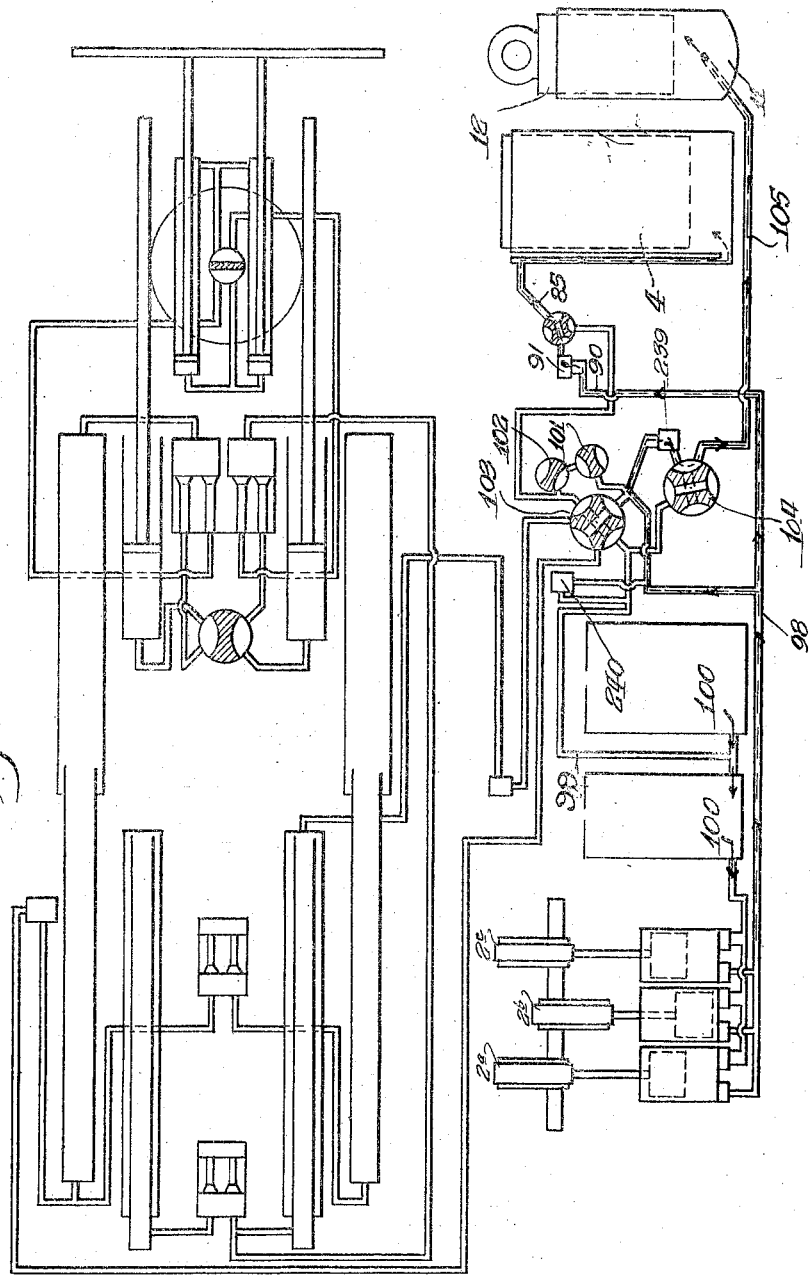

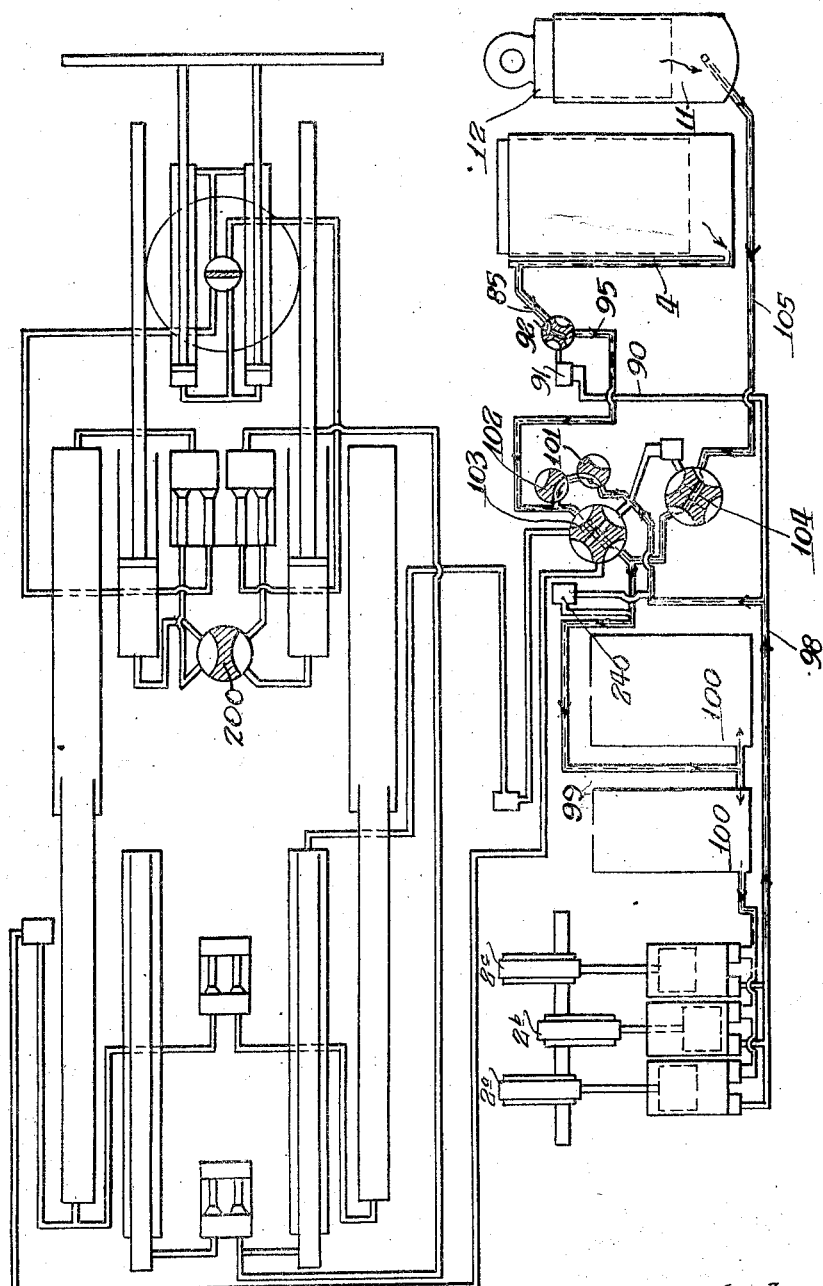

Patented May 10, 1927.

1,628,071

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Application filed December 18, 1922, Serial No. 607,692. Renewed June 30, 1926.

This invention relates to power shovels and has for its object to provide a new and improved device of this description. The invention has among other objects to provide a power shovel which can be easily manipulated in a small space such as mines of various kinds to handle material by moving it from one place to another or into cars or the like, the construction and arrangement being such that comparatively large quantities may be handled in a short space of time and the apparatus be easily manipulated and controlled. The invention has other objects which are more specifically pointed out in the accompanying description.

Referring now to the drawings:

Fig. 1 is a side elevation showing one form of device embodying the invention.

Fig. 2 is a plan view with parts omitted of the device illustrated in Fig. 1.

Fig. 3 is an enlarged vertical sectional view through the central part of the machine.

Fig. 4 is a horizontal sectional view through the central part of the machine with parts omitted.

Fig. 5 is a plan view in part section of a portion of the elevating arm.

Fig. 6 is a sectional view on line 6—6 of Fig. 3.

Fig. 7 is a view taken on line 7—7 of Fig. 4.

Fig. 8 is a view taken on line 8—8 of Fig. 2.

Fig. 9 is a sectional view taken on line 9—9 of Fig. 3.

Fig. 10 is a plan detail view of the ejector plate, operating levers and turning racks.

Fig. 11 is a sectional view taken on line 11—11 of Fig. 2.

Fig. 12 is a sectional view taken on line 12—12 of Fig. 11.

Fig. 13 is a sectional view taken on line 13—13 of Fig. 10.

Fig. 14 is a sectional view taken on line 14—14 of Fig. 3.

Fig. 15 is a sectional view taken on line 15—15 of Fig. 2.

Fig. 16 is a sectional view taken on line 16—16 of Fig. 15.

Fig. 17 is a sectional view taken on line 17—17 of Fig. 10.

Fig. 18 is a sectional view taken on line 18—18 of Fig. 17.

Fig. 19 is a sectional view taken on line 19—19 of Fig. 2.

Fig. 20 is a sectional view taken on line 20—20 of Fig. 6.

Fig. 21 is a vertical section through the main controlling valves.

Fig. 22 is a sectional view taken on line 22—22 of Fig. 21.

Fig. 23 is a sectional view taken on line 23—23 of Fig. 21.

Fig. 24 is a sectional view taken on line 24—24 of Fig. 21.

Fig. 25 is a plan view in part section of the valve to control the turning of the scoop and to operate the ejector plate.

Fig. 26 is a sectional view taken on line 26—26 of Fig. 25.

Fig. 27 is a sectional view taken on line 27—27 of Fig. 25.

Fig. 28 is a sectional view taken on line 28—28 of Fig. 26.

Fig. 29 is a sectional view taken on line 29—29 of Fig. 25.

Fig. 30 is a sectional view taken on line 30—30 of Fig. 25.

Fig. 31 is a view similar to Fig. 30 with the valve in a different position.

Fig. 32 is a sectional view taken on line 32—32 of Fig. 9.

Fig. 33 is a sectional view taken on line 33—33 of Fig. 4.

Figs. 34, 35, 36, 37, 38, 39, 40, 41, 42, 43 and 44 are diagrammatic views of the fluid pipe system showing the various paths of the fluid during the various operations of the machine, more fully explained hereafter.

Figure 34 shows the position of the valves when the pump is operating but the fluid is being by-passed so that none of the parts are operative. In Figure 35 power is applied to the central lifting jack and the scoop is being pushed forwardly. In Figure 36 the scoop is being drawn rearwardly. In Figure 37 the scoop is being swung pivotally toward the right. In Figure 38 the scoop is being swung pivotally from its extreme right hand position to a position in front of the machine. In Figure 39 the scoop is being swung pivotally to a position the reverse of that shown in Figure 37. In Figure 40 the scoop is being swung pivotally from its extreme left hand position toward the central position. In Figure 41 the scoop is shown in its extreme right hand position and the ejector mechanism is being actuated. Figure 42 is similar to Figure 41 but shows the ejector mechanism being retracted. In Figure 43 power is being applied to the cylinder 11 to lift the arm. In Figure 44 power is being released from the cylinder 11 so as to permit the arm to be dropped.

Like numerals refer to like parts throughout the several figures.

For the purposes of illustration I have shown one form of my device embodying the invention in which a portion of the mechanical movements are actuated by a power fluid, such as hydraulic power. The construction and operation of the machine may perhaps be best understood by first pointing out the main structural features and the various mechanical functions performed by the machine, and thereafter, describing the details of the hydraulic system together with the various controlling devices therefor.

Referring now to the drawings I have illustrated a construction wherein there is a base frame 1 upon which the mechanism is carried. This base may be of any form and may be mounted in any desired manner, principally so that it may be moved from place to place. In the form shown, the base is detachably mounted on suitable truck wheels, so that it may be operated either on or off the tracks.

Mounted centrally upon the base frame 1 is a vertically disposed cylinder 3 containing a piston 4, arranged so that the piston may be raised by fluid pressure to engage a fixed part, such as the roof, and thereby forms a holding jack for the machine while it is in operation.

In the form illustrated most of the operating parts of the machine are mounted on a rotatable frame or turntable 5 which has bearing on the base 1 and moves axially about the vertically disposed cylinder 3, as best shown in Figure 3.

Means are provided for moving the turntable 5 around into any desired position together with the mechanism mounted thereon. In the construction herein shown this is accomplished mechanically as follows:—

A motor $2^d$ mounted on the turntable, is connected by suitable intermediate gearing with a pump 2, and there is a shaft 16 connected with one of these gears (see Figure 4). This shaft has a worm 17 which engages a worm gear 18 (see Figures 1, 4 and 6) on a shaft 19. This latter shaft is provided with bevel gears 20 and 21 which are normally free from the shaft but which may be connected thereto by clutches 22 and 23. These clutches are of any standard construction, and work oppositely so that when one is moved to its operative position the other is moved to its inoperative position. The clutches are operated in any suitable manner. As herein shown (see Figure 4) there is a bell-rank lever 24 pivotally mounted on a shaft 25. This bell-crank lever has a link 26 which is connected with one clutch and a link 27 which is connected with the other clutch. The shaft is provided with a crank 28 which is connected with a link 29 and with the operating lever 30. It will thus be seen that when the lever is moved in one direction one clutch is thrown in and the other out, and when it is moved to the other direction, the other clutch is thrown in and the first clutch out. There is also a neutral position as shown in Figure 4. Connecting with the bevel gears 20 and 21 is a bevel gear 31 (see Figures 3 and 4) which has a hollow shaft 32 mounted upon a suitable bearing 33. Said bearing is connected at one end with a sleeve 34 in which the shaft 19 is journaled. The other end of the bearing 33 is connected with a portion of the turntable 5. The hollow shaft 32 has a pinion 35 which engages a toothed portion 36 on the base frame 1. It will thus be seen that when one clutch is thrown in the hollow shaft 32 will be driven in one direction to rotate the turntable 5 and the mechanism carried thereby in one direction, and when the other clutch is thrown in the shaft 32 will be rotated in the opposite direction to rotate the turntable in the opposite direction. By this means the shovel may be brought to any desired position circumferentially.

Mounted upon and carried with the turntable is a beam 8 which carries the shovel 9. The beam is preferably made up of two elements, $8^a$, $8^a$, arranged on opposite sides of the centrally disposed holding jack. The beam 8 as herein shown is slideably mounted on a movable support or elevating arm 10, as clearly shown in Figures 1, 2, 3 and 5. This elevating arm is such that it may be lifted and lowered to vary the positions of the shovel. In the form shown it comprises a pair of elements $10^a$, $10^a$ on opposite sides of the centrally disposed holding jack, and connected at their forward and rear ends as shown. The rear ends of the arms $10^a$, $10^a$ are pivotally journalled on a transverse horizontal shaft 40, which is carried on a bracket 41 extending upwardly from the turntable 5 and rearwardly of the central holding jack, as shown in Figures 2, 3 and 5.

Means for moving the elevating arm 10 pivotally about its axis so as to raise and lower the shovel consists of a cylinder 11 having a piston 12 therein pivotally connected with the elevating arm 10 adjacent its forward end as indicated at $12^a$. The lower end of the piston 11 is pivotally mounted on the turntable 5 by trunnions 13, 13 as shown in Figure 3. Piping for the cylinder 11 is connected through a pipe 15 and a swivel joint 14, in axial alignment with the trunnions 13, 13, and connected to the hydraulic system, as will hereinafter be described.

A pair of bearing rollers 42, 42 are provided at the forward end of the arm 10 to support each of the beam elements 8ª, 8ª, and rollers 43, 43 and 44, 44 are provided at the rear end of said arm above and below said beam, so that the latter may be freely moved backward and forward in supporting engagement with the elevating arm 10.

This backward or forward movement of the beam 8 is hereinafter termed a "radial" movement, inasmuch as the entire mechanism is mounted to swing about a vertical axis, as above described.

In the form shown, the radial movements of the shovel are controlled hydraulically, and for this purpose there are provided two pair of radial cylinders, each pair acting in opposite directions. The lower and larger pair of cylinders 45, 45, hereinafter called the "out" cylinders, are each attached to the forward end of the beams 8ª, as shown in Figure 10, and extend rearwardly along the inner side of one of the beam elements 8ª. The plungers 47, 47 in these "out" cylinders, are connected at their rear ends to a cross member 46 at the rear end of the elevating arm 10 to thrust the beam forward. The pair of smaller cylinders 48, 48 hereinafter referred to as "in" cylinders, are arranged above the large cylinders 45, 45 and are supported from a front cross member 49 on the elevating arm 10. Their plungers 50, 50 bear against the back end of the beam 8 to force the beam rearwardly.

Means are also provided for swinging the scoop 9 laterally with respect to the beam 8. This lateral swinging of the scoop is hereinafter referred to as a wrist movement, whereby the scoop may be swung laterally to the right or left respective to the beam when discharging into a car or the like, so that the beam 8 need not always be swung in alignment with the scoop. This arrangement is particularly adapted for use in close quarters, such as in a mine, in which there is limited space available for swinging of the beam 8 at one side or the other of the machine. The wrist movement of the scoop is preferably arranged on an axis inclined to the longitudinal axis of the beam as clearly shown in Figure 1, so that when the beam is in a raised position, as shown in dotted lines in this figure, the scoop will be swung in a transverse plane at an angle to the beam, so as to facilitate the passage of the scoop over a car or the like when the machine is operating under a low roof.

In the form shown the mechanism for producing the wrist movement is shown in detail in Figures 10, 11 and 12. The scoop 9 is pivotally connected to the forward end of the beam 8 on an axis inclined forwardly of the beam. This pivotal connection consists of a pair of oppositely disposed studs 55 and 56 on the scoop frame 67. These studs have bearing in upper and lower cross arms 57 and 58 respectively, attached to the forward end of the beam elements 8ª, 8ª. A gear 59 is keyed on an extension of the upper stud 55 and is engaged on opposite sides by a pair of oppositely disposed racks 60, 60. These racks are each connected with a plunger 61, operating in a cylinder 62. As will hereinafter more fully appear, these cylinders are hydraulically controlled so that as power is applied to one cylinder it is released in the opposite cylinder and vice versa, thereby pivotally moving the scoop laterally with respect to the beam 8. Means for limiting the movement of the scoop in either direction, and locking it during the radial movements of the scoop, are also provided, as will hereinafter appear.

The scoop 9 is mounted at the front end of the beam 8 in approximately forwardly continuing relation therewith and faces forwardly, and material is ejected from the front end of the scoop by ejecting means operating longitudinally of the scoop, thus affording a relatively great range of vertical movement of the scoop in operating in a vertically limited space, and permitting the discharge of material from the scoop in a space quite limited vertically. In addition material may be removed from the top portion of a mass of material adjacent a roof, as in a mine.

The shovel is particularly adapted for the underground mining of coal. In this type of mining the coal is loosened from the mine wall in comparatively unbroken masses, and it is important that the coal be taken out in as large pieces as possible, as the size of the coal is a determining factor of the market price of the coal.

By reason of the beam 8 with the forwardly facing scoop 9 on the front end thereof being carried on the turntable for longitudinal as well as vertical movement with respect to the turntable 5, the scoop may be driven against a loosened mass of coal at the top portion thereof adjacent the roof of a mine with sufficient force to drive the scoop into the mass and fill the scoop with the result that the coal is scooped in comparatively large pieces as compared with the scooping of the coal below the top portion of the mass, for the reason that because of the weight of the mass it is necessary in order to remove the coal from the mass below the top portion thereof that it be removed from the face of the mass by more or less of a scraping or surface cutting action resulting in breaking the coal up into comparatively small pieces. Accordingly in removing the loosened mass the scoop is successively driven into the top portion of the mass along the same for the removal of the coal and is then worked downwardly as the mass decreases in height, always working against the top portion of the diminishing mass with a driving action rather than a scraping action to scoop the coal.

It will be observed that by reason of the beam 8 being mounted for longitudinal as well as vertical movement with respect to the turntable 5, the shovel is well adapted for operation as above described, and that the direct impulse of the scoop 9 may be directed against a mass of material throughout a considerable range laterally without changing the position of the shovel, and that the hereinbefore holding jack directly reacts the driving of the scoop into the mass by reason of the fact that the longitudinally movable beam 8 is disposed radially of the jack.

The mechanism for ejecting material from the scoop comprises two cylinders 65, 65 secured to a support 66 on the shovel frame 67. A pair of plungers 68, 68 in these cylinders are connected through plunger rods 69, 69 to a cross member 70. This cross member 70 is connected with an ejector plate 71 through a suitable system of links so as to move said plate longitudinally of the shovel and eject material therefrom as desired. The form of link mechanism illustrated is best shown in Figures 10, 11 and 13.

The cross member 70 is pivotally connected at one end to a centrally disposed link 73, and at the opposite end of said cross member to a pair of links 74, 74, arranged above and below the link 73. The vertical arrangement of these links is clearly shown in Figure 13 and is for the purpose of applying substantially uniform thrust to the ejector plate. The forward ends of the links 73 and 74 are connected to the ejector plate by links 75, 75 and the rearward ends of the links 73 and 74 are connected to the shovel frame 67 by links 76, 76. A pair of guideways 77 are provided on opposite sides of the scoop in which guides 78, 78 on the ends of the ejector plate are engaged.

The hydraulic system for controlling the various movements of the hydraulically operated parts will now be described.

Reference to the diagrams shown in Figures 34 to 44 shows the pump 2, consisting of cylinders $2^a$, $2^b$, and $2^c$. In the hydraulic system shown the connections to the various operating parts are effected through two main controlling valves 103 and 104, and by-pass valves 101 and 102. These valves are preferably of a unitary structure, as shown in Figures 21 to 24, and are mounted at the rear of the central lifting jack, as shown in Figures 3 and 4. As shown, they are of the plug type, but it will be understood that other forms of valves may be used, if desired. Through these valves, pressure is directed or reversed for the radial, wrist, ejector and elevating movements, and for the holding jack, as now will be shown from the various diagrams and the details of the valves illustrated.

When the motor is running idle, as shown in Figure 34, the water circulates from the pump through a high pressure pipe 98 and by-pass valves 101 and 102, a main operating valve 103, and discharges into storage tanks, 100, 100 through a pipe 99, hereinafter termed the low pressure pipe, so that no work is being done. In the drawings two storage tanks are shown, in order to provide the required capacity, one being located underneath the motor $2^d$, as shown in Figure 1, and the other located forwardly of the elevating piston 11, as shown in Figure 2.

In Figure 7 it will be seen that there is a link connection between the main operating valve 103 and the by-pass valve 102, and another link connection between the operating valve 104 and the by-pass valve 101. The connection between the upper pair of valves 103 and 102 is provided through a pair of levers 109 and 110 and a connecting link 111. In the "off" position, shown in Figure 7, the levers are parallel and at approximately right angles to the links, so that the motion of the operating lever of valve 103 in either direction is followed by a substantially equal motion of the by-pass valve 102 in the same direction. Valve 103 is provided with double passageways 130 and 131 through its plug, which permits water to flow from the high pressure pipe 98 to one pair of cylinders, such as the "out" cylinders, 45, 45 to force said cylinders forward, while the plungers 50, 50 of the "in" cylinders 48, 48 force the water out, and discharge it through the low pressure pipe 99 into the storage tanks.

The position of the valves 102 and 103 for a radial movement forwardly is shown in the diagram in Figure 35. In this position the by-pass valve 102 is closed, and the water is forced from the high pressure pipe 98 through one passageway 131 of the valve 103 into the "out" cylinders 45, 45. At the same time the opposite passageway 130 in the valve 103 directs the water from the "in" cylinders 48, 48 to the low pressure pipe 99 and discharge into the tanks 100, 100. Reverse motion of the valve 103 interchanges the actions of the two pair of "in" and "out" cylinders, and also closes the by-pass valve 102, as shown in Figure 36.

Main operating valve 103 and its by-pass valve 102 is controlled through a lever 117, on its valve stem 108. This lever is connected through a link 116, and a bell-crank lever 115 loosely mounted on valve stem 118 of valve 104 to a link 114, which is in turn connected to a lever 113 mounted integral with the manual control handle 112.

The hydraulic pressure to effectuate radial, wrist and ejector movements is supplied to the beam through operating valve 103 and a single set of flexible connections. This permits these mechanisms to be actuated in sequence, as is desired in the operation of a shovel of this type, this sequence of movements being controlled first through the main operating valve 103, and then by suitable switching valves mounted on the beam, which valves are in turn controlled mechanically by a single manually controlled lever, mounted on the turntable and connected to the valves through suitable links, arranged so that the valves on the beam may be operated in all positions of the beam and scoop with respect to the turntable. The switching valves are as follows: Valve 160 for the "out" cylinders, and valve 161 for the "in" cylinders, and valve 162 for the wrist and ejector cylinders. The details of these valves and their controlling means will appear hereinafter in the order of their description. This arrangement also minimizes the number of flexible joints necessary between the turntable and the movable beam, upon which the said radial, wrist and ejector mechanisms are mounted.

The flexible piping connections to the beam comprise a pipe 150 leading from the operating valve 103 to a passageway 156 in the shaft 40 upon which the elevating arm is pivoted, and thence to a swivel joint 151 at the left end of said shaft. A similar pipe 152 leads to a similar passageway 157, connected with a swivel joint 153 on the right end of the shaft 40. These swivel joints may be of any approved construction, details of which are shown in Figures 5, 6 and 20.

From the left hand swivel joint 151 a pipe 170 leads to the rear end of the plunger 47 in the left hand "out" cylinder 45 as shown in Figure 9. The plungers 47, 47 are hollow, and communicate with the main part of their respective cylinders 45, 45. A second pipe 181 at the front end of the left hand cylinder 45 communicates with the wrist and ejector switching valve 162 at the forward end of the beam. The purpose of this connection will hereinafter appear. The first mentioned pipe 170 also communicates with the switching valve 160 mounted between the rear ends of the two "out" pistons 47, 47 and from thence to a pipe 171 entering the rear end of the right hand piston 47. The valve 160 may be of any suitable construction, as for instance, of the poppet type shown in detail in Figure 32, and comprising two poppet valve heads 172, 172, arranged in series, this construction being preferred in order to prevent this valve acting as a check valve when the pressure varies on opposite sides of the valve. In the construction shown both of the valve heads 172, 172 are opened by means of a pair of cams 173, 173 acting upon the valve stems 174, 174. Pistons 174$^a$, 174$^a$ are preferably mounted on the valve stems 174, 174 and a by-pass 174$^b$, 174$^b$ extends from the inner side of said pistons and through said stems to the outer side of their respective valve heads, so as to equalize the fluid pressures on opposite sides of the valve heads, thereby permitting the valves to be operated easily while under pressure. Both valve heads 172, 172 are actuated simultaneously by movement of the operating lever 175. This lever is connected by link 176 to one arm 177$^a$ of a bell crank lever 177 as shown in Figures 6 and 7. This bell crank lever 177 is pivotally mounted on a support 51 projecting from the bracket 41, as shown in Figures 3 and 7. The other arm 177$^b$ of this bell crank lever is connected by a link 179 to the manually operated lever 180 on the turn table. The lever 180 also controls other switching valves on the beam, as will hereinafter appear.

A pipe 185 leads from the swivel joint 153 at the right hand side of the machine to the forward end of the right hand "in" cylinder 48. The rear end of the hollow plunger 50 in this cylinder is connected by a pipe 186 through the switching valve 161 and pipe 187 at the rear end of the plunger 50 in the left hand "in" cylinder. The valve 161 is similar in the present instance to the switching valve 160, already shown in detail in Figure 32, and above described in connection with the connections of the "out" cylinders. A pipe 190 is also connected to the pipe 186 and extends forwardly into one side of the switching valve 162. The valve 161 is operated by lever 191 connected in the present instance by a ball and socket joint 192 to a lever 193, which is similar to the lever 175 which operates the valve 160 shown in detail in Figure 32. The lever 191 is mounted at the rear end of a shaft 195 extending longitudinally along the left hand side of the beam. As will hereinafter appear, this shaft affords a controlling connection not only for the switching valve 161, but also to the switching valve 162 at the forward end of the beam which controls the wrist and ejector movements. A flexible connection is provided between the shaft 195 on the beam and the manually operated handle 180 on the turntable, including an arm 196, mounted on a bracket 52 on the elevating arm 10 and extending inwardly through an opening 53, as shown in Figures 3 and 6. The arm 196 is feathered on the shaft 195, so that the latter may slide freely therealong as the beam 8 is moved longitudinally of the supporting arm 10. The arm 196 has a ball and socket connection 197 with a link 198 as shown in Figures 6 and 7. The link 198 is connected to the arm 177ᵃ of the bell crank lever 177 which has already been described as in connection with the controlling means for valve 160 at the rear end of the "out" cylinders. Valves 160, 161 and 162 are therefore controlled by the same manual control lever 180 mounted on the turntable through common connecting elements 177 and 179.

Referring now to the diagrams in the Figures 35 and 36 which show the valves in position for forward and rearward radial movements respectively, it will be seen that both switching valves 160 and 161 are open to permit free flow of fluid through both "out" cylinders 45, 45 and both "in" cylinders 48, 48. Upon completion of the radial movement, however, and when the wrist or ejector movements are taking place, it is desirable to lock the beam against radial movement, and for this purpose, valves 160 and 161 are closed, as shown in Figures 37 to 42. This serves to shut off the connections leading to right hand "out" cylinder 45 and left hand "in" cylinder 48, thus locking the beam against longitudinal movement in either direction. Hydraulic power supply to valve 162 is then provided through the left hand "out" cylinder and the right hand "in" cylinder, as will hereinafter more fully be described.

The switching valve 162 at the forward end of the beam controls the wrist and ejector movements. It will be understood that these movements are preferably performed in sequence. During a radial movement, as for instance, a forward movement of the beam, the scoop is arranged in longitudinal alignment with the beam. When the forward radial movement of the scoop is completed, it will then be turned to the right (or left) with respect to the beam by its wrist movement until it is in position over the car or the like, and then the ejector mechanism is actuated to eject the material from the scoop. The sequence of movements is then reversed until the scoop is again in a longitudinal alignment with the beam, and the backward radial movement returns the scoop to its original position.

The valve 162 also includes a hand operated plug valve 200 which may be manipulated to change the wrist motion in this sequence of movements either to the right or to the left as desired.

Details of valve 162 are shown in Figures 11, 12 and 25 to 31, and as shown, comprises four valve units of the poppet type. The valve units are in pairs, each pair comprising an outer valve 201 and an inner valve 204. The outer valves 201, 201 are actuated by cams 202, 202 on the shaft 203, and the inner units 204, 204 are actuated by a pair of similar cams 205, 205 on the shaft 203. The latter shaft is provided with an arm 225, controlled by arm 226 on control shaft 195. The valve units 201 and 204 are similar in construction, each comprising a stem 206, and a piston 207, spaced longitudinally from the head 208 of the valve, and having a by-pass 209 extending through said head to equalize the pressure on the valve head. The valve 162 has six pipe connections to it. Two of them are supply pipes comprising the pipe 181 leading from the forward end of the left hand "out" cylinder 45, and the pipe 190 connecting with the rear end of the right hand "in" plunger 50. Two other pipes 210 and 211 on the left and right sides of the valve 162 respectively, are connected to the respective left and right wrist or turning cylinders 62, 62. The third pair of pipes 212 and 213 are connected through a swivel joint 214 on the axis of the scoop to the ejecting cylinders 65, 65. Details of the swivel joint 214 are shown in Figures 17 and 18. This swivel joint is arranged and constructed so that the water from one of the pipes, for instance the pipe 212, will flow through a hollow center stem 220 and a pipe 221 which communicates with the rear ends of the ejecting cylinders 65, 65, while the other pipe 213 communicates through a sleeve 222 surrounding the center stem 220 to a pipe 223 extending to the forward ends of the ejecting cylinders 65, 65.

In the position of the cams 203 and 205 shown in Figures 26 and 28, all of the valve units 201 and 204 are closed. This is the position corresponding to Figures 34, 35 and 36, in which the wrist and ejector movements are inoperative. After the forward radial movement of the scoop is completed, and it is desired to actuate the wrist movement, as for instance to the right, the lever 225, which is operated from the forward end of the control shaft 195 by an arm 226, is moved upwardly until the outer cams 202 open the outer valve units 201, 201. Communication is then opened through the valve units 201 and the supply pipes 181 and 190 connected to the left hand "out" cylinder and the right hand "in" cylinder respectively. The left hand "out" cylinder 45, being in communication with the high pressure side of the system, and the right hand "in" cylinder, being in communication with the discharge tanks as shown in Figure 37, water will be introduced under pressure through the supply pipe 181 and the left hand valve 201. From thence the water will pass through the plug valve 200 and either to the left hand pipe 210 connected to the left hand wrist cylinder, or the right hand pipe 211 connected to the right hand wrist cylinder, depending upon the position of the plug valve 200. In Figures 30 and 37 the plug valve 200 is in position to direct the water into the left hand wrist cylinder 62, with the result that the plunger and rack therein will be forced outwardly to swing the scoop pivotally to the right. At the same time the right hand valve 201 is opened and communication with the discharge, through the right hand "in" cylinders, or low pressure side of the system as before pointed out, so that the water from the right wrist cylinder 62 will be discharged through the valve 200 and the right hand valve 201 to the pipe 190 communicating with the "in" cylinders and from thence into the low pressure side of the system. The wrist movement is reversed to return the scoop into its longitudinal alignment by reversing the main controlling valve 103, as shown in Figure 38, thereby changing the high pressure side of the system to the low pressure side. The valves 201 and 200 remain in the same position as in Figure 37 for this purpose. This reverses the wrist motion without causing radial movement of the scoop since the connections to one "in" and one "out" cylinder are cut off as described above.

The wrist movement of the scoop may be changed to the left by turning the valve 200 into the position shown in Figure 31, and the diagrams in Figures 39 and 40. In this position the valves 201, 201 are open as in the case of the right hand wrist movement, but the direction of the flow of the water through the valve 200 is reversed so as to cause the scoop to swing to the left instead of to the right. The valve as shown is adapted to be manually controlled by a handle 230. It will be understood however that it is ordinarily unnecessary to manipulate this handle except when it is desired to change the sequence of the various movements so as to substitute the wrist movement to the left instead of to the right or vice versa. In other words, the valve 200 may be set for either right or left wrist movement as desired with each sequence of radial, wrist and ejector movements.

The angular movement of the scoop may be limited by suitable means, as for instance, a stop 235 may be mounted on the scoop (see Figures 2, 11 and 16) to engage the upper arm 57 at the forward end of the beam. As shown in Figure 2, this stop is shown on the left side of the scoop for turning the latter to the right, but it may be changed to the other side as indicated at 235ª, when it is desired to swing the scoop to the left.

In Figure 41 the position of the valves is shown after the radial and wrist movements are completed and the ejector movement is commenced. This ejector movement is accomplished by turning the handle 180 on the turntable to a third position, which rotates the shaft 195 on the beam and moves the cams 205, 205 into position to open the inner pair of valve units 204, 204. This movement simultaneously closes the valves 201, 201 so that the fluid is then introduced from the high pressure side into the pipe 212 leading to the rear ends of the ejector cylinders 65, 65. As shown in Figure 41 the direction of flow is from the "out" cylinders, which normally would follow in the sequence of movements after the movement shown in Figures 37. In this case the water flows through the swivel joint 214 and its stem 220 (see Figure 17) to the pipe 221 which communicates with the rear ends of the ejector cylinders 65, 65. The water from the front ends of the cylinders is discharged through the pipe 222 and swivel joint 214 back through pipe 213 and right hand valve 204, in the switching valve 162, and from thence to the low pressure side of the system. The movement of the ejector mechanism is reversed as shown in Figure 42, by reversing the main operating valve 103, without affecting the position of the switching valves 204, 204. The control shaft 195 is controlled through the lever mechanism shown in Figure 7, and hereinbefore described in detail in connection with the manual control lever 180, link 179, and bell crank lever 177.

Means are provided for locking the scoop against turning during the radial movements of the beam, which comprises a locking arm 236 (see Figures 11, 15 and 16) keyed on control shaft 195. This arm is adapted to be swung upwardly into a slot 237 in the scoop frame 67, when the wrist and ejector switching valve 162 is closed, as shown in Figures 11, 15, 16 and 26, and the radial switching valves 160 and 161 are opened. The scoop is thus locked while the radial movements are performed, but is unlocked by the same movement of the shaft 195 which opens the valve 162, either for the wrist or ejector movements.

Referring now to the central holding jack, details of which are shown in Figures 3 and 19, it will be seen that there are two packing rings 80 and 81 at the top of the holding jack cylinder 3. These rings are formed in a collar 82 carried on a ring 83 which is connected with the rotatable frame 5 and has bearing on the upper part of the fixed cylinder 3. The packing ring 80 is smaller than the packing ring 81, the former engaging the piston 4 and the latter engaging the upper end of the cylinder 3. The pressure is introduced to the lifting cylinder through a pipe 85, connected to the collar 82 between the rings 80 and 81, and passes downwardly to the bottom of the cylinder 3 through grooves 86, 86, as shown in the Figures 3, 4 and 19. Owing to the difference in dimensions of the packing rings 80 and 81 it will be seen that there is a lifting effect provided when the fluid is under pressure proportionate to the difference in the areas of the two circles. The upward pressure of the fluid therefore supports a portion of the weight of the mechanism carried by the rotating frame 5, thus relieving considerable friction in the central bearing about which this rotatable frame moves, and making the turning thereof much easier. The pressure may be manually controlled under certain conditions by valve 88, having a manual control handle 89. Details of this valve are shown in Figure 33.

In the form illustrated the pipe 90 is directly connected to the high pressure side of the hydraulic system, through the valve 103 so that whatever pressure is necessary to move any of the other parts of the machine hydraulically will also be applied through the valve 88 to the piston 4. In the position shown in Figure 33 a passageway 93 in the valve permits the fluid to flow into the pipe 85 and from thence to the central holding jack. In the diagrams, it will be seen that the holding jack is adapted to be put under pressure during all of the operating movements illustrated in Figures 35 to 43, inclusive. The check valve 91 in valve 88 is provided so that after the fluid pressure is once applied to the holding jack it will be maintained indefinitely therein until positively released by manipulation of the valve member 92 to open from pipe 85 into the discharge pipe 95 communicating with the low pressure side of the system as shown in Figure 44. Therefore if the machine is operating under conditions where a relatively low pressure is required to perform the necessary work, the holding jack will maintain the machine under the relatively low pressures, whereas if the working conditions are changed so as to require higher pressures in the hydraulic system the pressure in the holding jack will be automatically increased proportionally, and will be maintained until released through manually controlled valve 88, or by leakage.

Means are also provided for automatically limiting the vertical movements of the lifting jack which comprises a trip member 188 carried on a vertically disposed bracket 188ª attached to the top of the piston 4. The trip member 188 is arranged to engage a dog 189 mounted integrally with a handle 89 and arranged to automatically open the discharge passageway 94 of the valve 88 thereby relieving the pressure in the cylinder 3 when the piston 4 has reached a predetermined height.

The movement of the elevating arm 10 is controlled through the operating valve 104 and pipe 105. This valve is of the plug type, similar to valve 103, and both of these valves are shown in detail in Figures 21 to 24.

There are three positions of the valve 104 and its associated by-pass valve 101. The off or closed position is shown in the diagrams in Figures 34 to 42. In this position valve 104 is closed and by-pass valve 101 is open. In order to raise the scoop the valve 104 is moved into a clockwise direction into a second or "up" position indicated in the diagram in Figure 43. A third or "down" position of the valve 104 is for lowering the scoop, and it is this position of the controlling levers which is shown in Figure 7, in which it will be seen that the link 122 is substantially in alignment with lever 120, whereas the lever 121 on the by-pass valve is substantially at right angles to said link 122. In this position the lever 120 has been moved to the left or in a counter clockwise direction from the "off" position. It will be seen from this figure that the arrangement of the levers 120 and 121 and the connecting link 122 is such that a movement in a clockwise direction to the "off" position causes a negligible movement of the lever 121 which operates the by-pass valve 101, so that said by-pass valve 101, which is open in the "off" position of valve 104, will also be open in the "down" position of the valve 104, as is seen to be the case in the diagram in Figure 44 and which corresponds to the position of the valves 104 and 101 shown in Figure 7. The by-pass valve 101 is thus left open when the beam is lowered, because the beam has enough weight of itself to lower the elevating arm 10 and discharge the water from the elevating cylinder 11 into the low pressure side of the system, as shown in Figure 44. When in the "up" position, which is a movement still further in a counter clockwise direction from the "off" position, the by-pass valve 101 is closed as has already been noted in Figure 43, to direct the pressure to cylinder 11.

The valve 104 is manually controlled by a hand lever 123, connected through a link 124 to a lever 125 mounted on the stem 118 of valve 104.

In connection with the valve 104 shown in detail in Figure 21, a check valve 239 is interposed between the high pressure pipe line 98 and said valve. This check valve is for the purpose of preventing the water from flowing from the elevating cylinder 11 into the radial cylinders through the valve 104 should both valves 104 and 103 be open at the same time. Under these conditions the water in the lifting cylinder might provide sufficient pressure to give a radial movement to the beam.

A safety valve 240 of any ordinary construction may also be provided in the system between the high pressure pipe 98 and the low pressure pipe 99 as indicated in the diagrams in Figures 34 to 44.

The operation of the machine will be sufficiently understood, by one familiar with the art, from the foregoing description.

The control levers are all mounted on the turntable convenient for a single operator. These control levers comprise the turning lever 30, the main valve control lever 112, the radial, wrist and ejector control handle 180 and the elevating control handle 123, all arranged on the turntable at the left hand side of the machine as best shown in Figures 4 and 7. The motor $2^d$ and the fluid pressure pump 2 driven thereby are mounted on the turntable on one side of the beam 8 and elevating arm 10, and the control levers are manually operable from the turntable at the other side of the beam 8 and elevating arm 10, thus affording a compact arrangement and convenient control with a view toward efficient operation, particularly in confined spaces.

It will be noted that the machine can be manually controlled by the various control devices so as to rotate the beam about a vertical axis, to elevate the beam by moving it about a horizontal axis, and move the beam radially, that is to say, backwardly and forwardly. The scoop may also be swung to one side of the beam, or the other side of the beam, as desired by what has hereinbefore been termed the "wrist" movement, and material may be ejected from the scoop by means of the ejector mechanism. The radial movement of the beam, the wrist movement of the scoop and the ejecter mechanism are operated by two levers, one of which controls the successive movements in one direction while the other controls the direction in which the movements take place. Under some conditions it may not be necessary nor desirable to operate the wrist movement of the scoop and in such case this movement may be eliminated from the usual sequence by passing the control mechanism directly from the radial movement position to the ejector movement position, or vice versa. Similarly, the radial and wrist movements may be utilized without the ejecter mechanism when desired.

Although I have shown and described one form in which my invention may be embodied, it will be understood that many other means may be employed for accomplishing the same results, without departing from the spirit and scope of my invention. For instance, hydraulic devices have been shown and described as a preferred power transmission means, but so far as the broader features of my invention are concerned, it will be understood that equivalent machanical power transmission means may be substituted if desired. I do not therefore wish to be understood as limiting myself to the specific details of mechanism or to the hydraulic devices illustrated herein, excepting as specifically limited in the appended claims.

I claim as my invention:

1. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, and a scoop pivotally mounted to swing laterally at one end of said beam.

2. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, and a scoop pivotally mounted at one end of said beam to swing laterally in a plane at an angle to the longitudinal axis of said beam.

3. In a power shovel, the combination of a base, a vertically adjustable holding jack mounted on said base, and extending upwardly therefrom, a turntable rotatably mounted on said base, an elevating arm pivotally mounted on said turntable for movement in a vertical plane, a beam slideably mounted on said elevating arm, mechanism for reciprocably moving said beam with respect to said elevating arm, and a scoop pivotally mounted to swing laterally at one end of said beam.

4. In a power shovel, the combination of a base, a vertically adjustable holding jack mounted on said base and extending upwardly therefrom, a turntable rotatably mounted on said base, an elevating arm pivotally mounted on said turntable for movement in a vertical plane, a beam slideably mounted on said elevating arm, mechanism for reciprocably moving said beam with respect to said elevating arm, and a scoop pivotally mounted on said beam to swing laterally in a plane at an angle to the longitudinal axis of said beam.

5. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power devices for actuating said beam mechanism and said ejector mechanism, and a single control device for operatively connecting said power devices with said last named mechanisms in sequence.

6. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power devices for actuating said beam mechanism and said ejector mechanism, a single control device for operatively connecting said power devices with said last named mechanisms in sequence, and means for locking said beam mechanism while said ejector mechanism is in operation.

7. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power devices for actuating said beam mechanism and said ejector mechanism, a single control device for operatively connecting said power devices with said last named mechanisms in sequence, and means connected with said control device for locking said beam mechanism while said ejector mechanism is in operation.

8. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power devices for actuating said beam mechanism and said ejector mechanism, a single control device for operatively connecting said power devices with said last named mechanisms in sequence, and a second control device associated with said power devices for reversing the sequence of movements of said mechanisms.

9. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power devices for actuating said beam mechanism, and said ejector mechanism, a single control device for operatively connecting said power devices with said last named mechanisms in sequence, means connected with said control device for locking said beam mechanism while said ejector mechanism is in operation, and a second control device associated with said power devices for reversing the sequence of movements of said mechanisms.

10. In a power shovel, the combination of a base, a vertically adjustable holding jack mounted on said base and extending upwardly therefrom to engage a fixed support above the machine, a movable scoop on said base having suitable power actuating devices and control mechanism therefor, and power connections between said power actuating devices and said holding jack for applying a holding pressure on the latter, varying with the power utilized in actuating said scoop.

11. In a power shovel, the combination of a base, a vertically adjustable holding jack mounted on said base and extending upwardly therefrom to engage a fixed support above the machine, a movable scoop on said base having suitable power actuating devices and control mechanism therefor, and power connections between said power actuating devices and said holding jack for applying and holding pressure on the latter, varying with the power utilized in actuating said scoop, and means automatically maintaining on said jack the maximum pressure applied through said power connections.

12. In a power shovel, the combination of a base, a vertically adjustable holding jack mounted on said base and extending upwardly therefrom to engage a fixed support above the machine, a movable scoop on said base having suitable power actuating devices and control mechanism therefor, power connections between said power actuating devices and said holding jack for applying a holding pressure on the latter, varying with the power utilized in actuating said scoop, means automatically maintaining on said jack the maximum pressure applied through said power connections, and manually controlled means for releasing the pressure on said jack at will.

13. In a power shovel, the combination of a base, a vertically adjustable holding jack mounted on said base and extending upwardly therefrom to engage a fixed support above the machine, a movable scoop on said base having suitable hydraulic actuating devices and control mechanism therefor, and means associated with said hydraulic devices for automatically applying to said holding jack the maximum hydraulic pressure utilized in actuating said scoop.

14. In a power shovel, the combination of a base, a vertically adjustable holding jack mounted on said base and extending upwardly therefrom to engage a fixed support above the machine, a movable scoop on said base having suitable hydraulic actuating devices and control mechanism therefor, and means associated with said hydraulic devices for automatically applying to and maintaining on said holding jack the maximum hydraulic pressure utilized in actuating said scoop.

15. In a power shovel, the combination of a base, a vertically adjustable holding jack mounted on said base and extending upwardly therefrom to engage a fixed support above the machine, a movable scoop on said base having suitable hydraulic actuating devices and control mechanism therefor, means associated with said hydraulic devices for automatically applying to and maintaining on said holding jack the maximum hydraulic pressure utilized in actuating said scoop, and manually controlled means for releasing the power on said jack at will.

16. In a power shovel, the combination of a base, a vertically adjustable holding jack mounted on said base and extending upwardly therefrom to engage a fixed support above the machine, a turntable rotatably mounted on said holding jack and elevating arm pivotally mounted on said turntable for movement in a vertical plane, a beam slideably mounted on said elevating arm, mechanism for reciprocably moving said beam wtih respect to said elevating arm, a scoop carried at one end of said beam, reciprocable ejector mechanism on said scoop, power devices for actuating said beam mechanism and said ejector mechanism, and means associated with said power devices for automatically applying a holding pressure on said holding jack in proportion to and varying with the power utilized in actuating said beam or ejector mechanism.

17. In a power shovel, a combination of a base, an elevating arm pivotally mounted on said base for movement in a vertical plane, a beam slideably mounted on said elevating arm, mechanism for reciprocably moving said beam with respect to said elevating arm, a scoop pivotally mounted at one end of said beam, mechanism for producing a wrist movement of said scoop respective to said beam, reciprocable ejector mechanism in said scoop, power devices for actuating said beam mechanism, said wrist mechanism and said ejector mechanism, and a single control device for operatively connecting said power devices with the three last named mechanisms in a predetermined sequence.

18. In a power shovel, a combination of a base, an elevating arm pivotally mounted on said base for movement in a vertical plane, a beam slideably mounted on said elevating arm, mechanism for reciprocably moving said beam with respect to said elevating arm, a scoop pivotally mounted at one end of said beam, mechanism for producing a wrist movement of said scoop respective to said beam, reciprocable ejector mechanism in said scoop, power devices for actuating said beam mechanism, said wrist movement and said ejector mechanism, a single control device for operatively connecting said power devices with the three last named mechanisms in a predetermined sequence and a second control device for permitting the reversal of the sequence of movements of said mechanisms.

19. In a power shovel, a combination of a base, an elevating arm pivotally mounted on said base for movement in a vertical plane, a beam slideably mounted on said elevating arm, mechanism for reciprocably moving said beam with respect to said elevating arm, a scoop pivotally mounted at one end of said beam, mechanism for producing a wrist movement of said scoop respective to said beam to one side of the longitudinal axis of said beam, reciprocable ejector mechanism on said scoop, power devices for actuating said beam mechanism, said wrist mechanism and said ejector mechanism, a single control device for operatively connecting said power devices with the three last named mechanisms in a predetermined sequence, and means associated with said wrist mechanism to change its direction of movement from one side of the longitudinal axis of the beam as aforesaid to the opposite side thereof, without changing the sequence of movements of said mechanism as above set forth.

20. In a power shovel, a combination of a base, an elevating arm pivotally mounted on said base, for movement in a vertical plane, a beam slideably mounted on said elevating arm, mechanism for reciprocably moving said beam with respect to said elevating arm, a scoop pivotally mounted at one end of said beam, mechanism for producing a wrist movement of said scoop respective to said beam to one side of the longitudinal axis of said beam, reciprocable ejector mechanism on said scoop, power devices for actuating said beam mechanism, said wrist mechanism and said ejector mechanism, a single control device for operatively connecting said power devices with the three last named mechanisms in a predetermined sequence, and means associated with said wrist mechanism to change its direction of movement from one side of the longitudinal axis of the beam as aforesaid to the opposite side thereof, without changing the sequence of movements of said mechanism as above set forth, and a control device for permitting the reversal of either sequences of movements above set forth.

21. In a power shovel, a combination of a movable frame, a beam slideably mounted on said frame, a scoop on said beam, and hydraulic means for actuating said beam comprising forwardly and rearwardly acting hydraulic devices each interposed between said beam and said frame, a fluid pump, valve means adapted in one position to direct fluid from said pump into one of said hydraulic devices and to discharge the fluid from the other hydraulic device, and upon movement of said valve into a second position to permit a reversal of movement of the fluid in said hydraulic devices.

22. In a power shovel, the combination of a movable frame, a beam slideably mounted on said frame, a scoop on said beam, ejector mechanism on said scoop, means for actuating said beam comprising two hydraulic devices arranged in series, and communicating with a fluid pressure means, other hydraulic devices for actuating said ejector mechanism having communication with said fluid pressure means through the first of said beam actuating devices, valve means for closing the second of said beam actuating devices to form a lock for the beam, and other valve means interposed between the first beam-actuating device and said ejector actuating means.

23. In a power shovel, the combination of a movable frame, a beam slideably mounted on said frame, a scoop on said beam, ejector mechanism on said scoop, means for actuating said beam comprising two hydraulic devices arranged in series, and communicating with a fluid pressure means, other hydraulic devices for actuating said ejector mechanism having communication with said fluid pressure means through the first of said beam actuating devices, valve means for closing the second of said beam actuating devices to form a lock for the beam, other valve means interposed between the first beam-actuating device and said ejector actuating means, and a single control device for both of said valve means.

24. In a power shovel, the combination of a movable frame, a beam slideably mounted on said frame, a scoop on said beam, ejector mechanism on said scoop, means for actuating said beam comprising two sets of oppositely acting hydraulic devices arranged in series, and communicating with a fluid pressure means, other hydraulic devices for actuating said ejector mechanism having communication with said fluid pressure means through the first of each set of said beam actuating devices, valve means for closing the second of each set of said beam actuating devices to form a lock for the beam, and other valve means interposed between each of the first beam-actuating devices and said ejector actuating means.

25. In a power shovel, the combination of a movable frame, a beam slideably mounted on said frame, a scoop on said beam, ejector mechanism on said scoop, means for actuating said beam comprising two sets of oppositely acting hydraulic devices arranged in series, and communicating with a fluid pressure means, other hydraulic devices for actuating said ejector mechanism having communication with said fluid pressure means through the first of each set of said beam actuating devices, valve means for closing the second of each set of said beam actuating devices to form a lock for the beam, other valve means interposed between each of the first beam-actuating devices and said ejector actuating means, and a single control device for all of said valve means.

26. In a power shovel, the combination of a movable frame, a beam slideably mounted on said frame, a scoop on said beam, ejector mechanism on said scoop, means for actuating said beam comprising two sets of oppositely acting hydraulic devices arranged in series, and communicating with a fluid pressure means, other hydraulic devices for actuating said ejector mechanism having communication with said fluid pressure means through the first of each set of said beam actuating devices, valve means for closing the second of each set of said beam actuating devices to form a lock for the beam, other valve means interposed between each of the first beam-actuating devices and said ejector actuating means, a single control device for all of said valve means, and means for reversing the action of said fluid pressure means as desired.

27. In a power shovel, a combination of a a movable frame, a beam slideably mounted said frame, a scoop on said beam, an ejector device on said scoop, and hydraulic means for actuating said beam and said ejector mechanism, comprising forwardly and rearwardly acting hydraulic devices each interposed between said beam and said frame, forwardly and rearwardly acting hydraulic devices interposed between said scoop and said ejector device, means connecting the respective forwardly acting devices for actuating said beam and said ejector, and other means connecting the respective rearwardly acting devices for actuating said beam and said ejector, a fluid pump, valve means adapted in one position to direct fluid from said pump into the forwardly acting devices, and to discharge the fluid from the rearwardly acting devices, and upon movement of said valve into a second position to permit the reversal of movement of fluid in said devices.

28. In a power shovel, a frame, an elevating arm pivotally mounted on said frame for movement in a vertical plane, a beam mounted on said arm, mechanism for reciprocably actuating, said beam respective to said elevating arm, a scoop carried at one end of said beam, reciprocable ejector mechanism on said scoop, power means mounted on said frame, a pair of oppositely acting alternative power connections extending from said frame to said elevating arm and beam, and means on said beam for operatively connecting said power connections with said beam actuating mechanism and said ejector mechanism.

29. In a power shovel, a frame, an elevating arm pivotally mounted on said frame for movement in a vertical plane, a beam mounted on said arm, mechanism for reciprocably actuating said beam respective to said elevating arm, a scoop carried at one end of said beam, reciprocable ejector mechanism on said scoop, power means mounted on said frame, a pair of oppositely acting alternative power connections extending from said frame to said elevating arm and beam, means on said beam for operatively connecting said power connections with said beam actuating mechanism and said ejector mechanism, and a single control device movable with said beam for controlling said operative connections in sequence.

30. In a power shovel, a frame, an elevating arm pivotally mounted on said frame for movement in a vertical plane, a beam mounted on said arm, mechanism for reciprocably actuating said beam respective to said elevating arm, a scoop carried at one end of said beam, reciprocable ejector mechanism on said scoop, power means mounted on said frame, a pair of oppositely acting alternative power connections extending from said frame to said elevating arm and beam, means on said beam for operatively connecting said power connections with said beam actuating mechanism and said ejector mechanism, a single control device movable with said beam for controlling said operative connections in sequence, and manual operating means for said last named control device mounted on said frame.

31. In a power shovel, a frame, an elevating arm pivotally mounted on said frame for movement in a vertical plane, a beam mounted on said arm, mechanism for reciprocably actuating said beam respective to said elevating arm, a scoop carried at one end of said beam, reciprocable ejector mechanism on said scoop, power means mounted on said frame, a pair of oppositely acting power connections extending to said elevating arm and beam, and having operative connections with both said beam actuating and ejector mechanisms, control means on said frame for alternatively supplying power from said power means to said power connections, and a single control device movable with said arm and beam for controlling said operative connections.

32. In a power shovel, a frame, an elevating arm pivotally mounted on said frame for movement in a vertical plane, a beam mounted on said arm, mechanism for reciprocably actuating said beam respective to said elevating arm, a scoop carried at one end of said beam, reciprocable ejector mechanism on said scoop, power means mounted on said frame, a pair of oppositely acting alternative power connections extending to said elevating arm and beam and having operative connections with both said beam actuating and ejector mechanisms, a single control device for operatively connecting said power connections to said actuating and ejector mechanisms, and locking means associated with each of said mechanisms and operable by said control device, each of said locking means being adapted to lock its respective mechanism against movement while the other mechanism is in operation.

33. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power means for actuating said beam mechanism and said ejector mechanism, a single control device for operatively connecting said power means with said last named mechanisms in a predetermined sequence, and locking means associated with each of said mechanisms and operable by said control device, said locking means being adapted to lock one of said mechanisms against movement while the other mechanism is in operation.

34. In a power shovel, the combination of a base, a turntable on said base mounted for movement in a horizontal plane, an elevating arm pivotally mounted on said turntable for movement in a vertical plane, a beam slideably mounted on said elevating arm, mechanism for reciprocably moving said beam with respect to said elevating arm, a scoop carried at one end of said beam, reciprocable ejector mechanism on said scoop, power means for actuating said beam actuating mechanism and said ejector mechanism, a single control device for operatively connecting said power means with said last named mechanisms in a predetermined sequence, and locking means associated with each of said mechanisms and operable by said control device, said locking means being adapted to lock one of said mechanisms against movement while the other mechanism is operative, and a second control device associated with said power means for reversing the movements of said mechanisms.

35. In a power shovel, the combination with a base, a turntable on said base mounted for angular movement in a horizontal plane with respect thereto, a beam, means on the turntable and carrying said beam for longitudinal movement and movement in a vertical plane throughout a range of generally horizontal positions, a forwardly facing scoop mounted on the front end of said beam in approximately forwardly extending relation therewith, ejecting means operating longitudinally of the scoop, and means for actuating said ejecting means independently of the actuation of said beam.

36. In a power shovel, the combination with a base, a turntable on said base mounted for angular movement in a horizontal plane with respect thereto, an elevating arm pivotally mounted on the turntable on a rearwardly disposed transverse horizontal axis and extending forwardly from said axis, a forwardly extending beam carried with said arm for longitudinal movement with respect thereto and for pivotal movement therewith throughout a range of generally horizontal positions, a forwardly facing scoop mounted on the front end of said beam in approximately forwardly extending relation therewith, ejecting means operating longitudinally of the scoop, and means carried with said beam for actuating said ejecting means independently of the actuation of the beam.

37. In a power shovel, the combination with a base, a turntable on said base mounted for angular movement in a horizontal plane, a scoop, mechanism carried by said turntable and extending across the same and carrying said scoop for operative movement, a motor and a fluid pressure pump driven thereby on said turntable at one side of said scoop carrying mechanism for operating the scoop, hydraulic actuating means for actuating said scoop carrying means, mechanical means for operating said turntable from said motor including releasable oppositely acting clutch devices, valve means for selectively controlling the actuation of said hydraulic actuating means by fluid pressure from said pump, and means manually operable from said turntable at the other side of said scoop carrying means for selectively controlling said valve means and clutch devices.

38. In a power shovel, the combination with a base, a turntable on said base mounted for angular movement in a horizontal plane, a longitudinally movable beam, means on the turntable and carrying said beam for movement in a vertical plane throughout a range of generally horizontal positions, a forwardly facing scoop mounted on the front end of said beam in approximately continuing relation therewith, ejecting means operating longitudinally of the scoop, and means for selectively actuating said beam, said beam carrying means, said ejecting means and said turntable including power means on the turntable at one side of said beam and beam carrying means and control means manually operable from the turntable at the other side of said beam and beam carrying means.

39. In a power shovel, the combination with a base, a turntable on said base mounted for angular movement in a horizontal plane, an elevating arm pivotally mounted on the turntable on a rearwardly disposed transverse horizontal axis and extending forwardly from said axis, a forwardly extending beam carried by said arm for longitudinal movement with respect thereto and for pivotal movement therewith throughout a range of generally horizontal positions, a forwardly facing scoop mounted on the front end of said beam in approximately continuing relation therewith, ejecting means operating longitudinally of the scoop, a motor and a fluid pressure pump driven thereby on said turntable at one side of said beam and elevating arm, hydraulic means associated with said elevating arm, beam and ejecting means for actuating respective thereof, mechanical means for operating said turntable from said motor including releasable oppositely acting clutch devices, valve means for selectively controlling the actuation of said hydraulic actuating means by fluid pressure from said pump, and means manually operable from said turntable at the other side of said elevating arm and beam for selectively controlling said valve means and clutch devices.

Signed at Chicago, in the county of Cook and State of Illinois, this 15th day of December, 1922.

WILLIAM W. SLOANE.